(12) United States Patent
Evans et al.

(10) Patent No.: US 9,764,906 B1
(45) Date of Patent: Sep. 19, 2017

(54) APPARATUS AND METHOD FOR MANIPULATING BULK SEED BOXES

(71) Applicants: Martin Evans, Terre Haute, IN (US); Jonathan Decker, Mt. Carmel, IL (US)

(72) Inventors: Martin Evans, Terre Haute, IN (US); Jonathan Decker, Mt. Carmel, IL (US)

(*) Notice: Subject to any disclaimer, the term of this patent is extended or adjusted under 35 U.S.C. 154(b) by 0 days.

(21) Appl. No.: 15/004,943

(22) Filed: Jan. 23, 2016

(51) Int. Cl.
*B65G 51/01* (2006.01)
*B65G 47/248* (2006.01)

(52) U.S. Cl.
CPC .................................. *B65G 47/248* (2013.01)

(58) Field of Classification Search
CPC ........ B65B 69/00; B65G 47/248; B65G 47/90
USPC ....... 414/405, 411, 419, 420, 458, 463, 771, 414/773, 776, 783; 53/381.1, 381.4, 76
See application file for complete search history.

(56) References Cited

U.S. PATENT DOCUMENTS

| | | | | |
|---|---|---|---|---|
| 1,516,973 A * | 11/1924 | Loughran | ............... | B22C 21/00 29/33 K |
| 4,013,177 A * | 3/1977 | Kinnicutt, Jr. | ....... | B65G 47/252 242/533 |
| 5,360,309 A * | 11/1994 | Ishiguro | .................. | B08B 9/423 414/404 |
| 5,421,889 A * | 6/1995 | Pollock | .................... | C23C 16/54 118/719 |
| 6,142,725 A * | 11/2000 | Crorey | ..................... | B23Q 1/52 198/379 |
| 6,224,315 B1 * | 5/2001 | Van Arkel | ............... | B65B 69/00 414/403 |
| 8,608,423 B2 * | 12/2013 | Hsu | ........................ | B65G 47/24 414/763 |
| 8,696,294 B2 * | 4/2014 | Gupta | .................... | C12M 23/50 414/411 |
| 8,926,260 B2 * | 1/2015 | Parslow, II | ............. | B65B 25/02 414/419 |
| 2011/0020103 A1 * | 1/2011 | Shonai | ................... | B65G 47/90 414/783 |

* cited by examiner

*Primary Examiner* — Gregory Adams
(74) *Attorney, Agent, or Firm* — R. Randall Frisk

(57) ABSTRACT

An apparatus for manipulating a bulk seed box having a lower box and an upper box, the upper box defining a cavity and opposing upper and lower edges, the apparatus including a base assembly; a lift assembly mounted to the base assembly for selective raising and lowering of a clamp assembly between lower and upper positions; a clamp assembly having a gripping assembly that has at least one upper clamp tab and at least one lower clamp tab and defines clamping and released positions, the clamping position including the at least one upper and lower clamp tabs being for clamping a seed box therebetween; a swivel assembly defining a horizontal axis and being mounted to and between the lift assembly and the clamp assembly for allowing the clamp enabling to be rotated at least 180 degrees about a horizontal axis relative to the lift assembly; and a height locator assembly operable to locate the clamp assembly at a home position with the at least one upper and lower clamp tabs being horizontally aligned with respective the upper and lower edges of the upper seed box of a bulk seed box positioned proximal thereto.

19 Claims, 22 Drawing Sheets

APPARATUS AND METHOD FOR MANIPULATING BULK SEED BOXES

FIELD OF THE INVENTION

This invention relates to seed boxes, and more particularly, to an apparatus for assembling and breaking down bulk seed boxes.

BACKGROUND OF THE INVENTION

The seed and farming industries often use standardized bulk seed boxes to transport large quantities of seed. These bulk seed boxes typically comprise a lower seed box—which might hold 1,000 pounds of seed—and a slightly larger upper seed box that has a porous, framework bottom. The upper box sits atop and is locked to the lower box, the two boxes together forming a combined seed box or "bulk seed box".

The farmer will transfer this "bulk seed box" to a seed wagon, seed tender, planter or other seed delivery device and, using a release valve door in the lower box, will release seed into such device. Seed from the upper box flows freely through the porous, framework (or similar configuration) floor of the upper box, down into the lower box, and out the release valve door. Once empty, the (combined) bulk seed box is transported to a storage area to await pick up by or delivery to the seed vendor for re-use. In the meantime, these empty bulk seed boxes take up a great deal of room. However, the lower box and upper box are sized and configured such that the lower box can be received—nested—into the upper box. This box breakdown procedure includes unlocking the upper box from the lower box, flipping the upper box (180 degrees), and then lowering it all the way down, whereupon the lower box is telescopically received within the upper box, and the two now nested boxes occupy about one half the space. This box breakdown procedure, done manually, is a labor-intensive and time consuming task.

What is desired is a mechanism to simplify seed box breakdown.

SUMMARY OF THE INVENTION

Generally speaking, for a bulk seed box having an upper seed box sitting atop a lower seed box, the invention is directed to an apparatus for breaking down seed boxes, that is, grasping, raising, flipping and lowering the upper seed box onto the lower seed box, which is then nested within the inverted upper seed box.

In one embodiment, an apparatus for manipulating a bulk seed box having a lower box and an upper box, the upper box defining a cavity and opposing upper and lower edges, the apparatus including a base assembly; a lift assembly mounted to the base assembly for selective raising and lowering of a clamp assembly between lower and upper positions; a clamp assembly having a gripping assembly that has at least one upper clamp tab and at least one lower clamp tab and defines clamping and released positions, the clamping position including the at least one upper and lower clamp tabs being for clamping a seed box therebetween; a swivel assembly defining a horizontal axis and being mounted to and between the lift assembly and the clamp assembly for allowing the clamp enabling to be rotated at least 180 degrees about a horizontal axis relative to the lift assembly; and a height locator assembly operable to locate the clamp assembly at a home position with the at least one upper and lower clamp tabs being horizontally aligned with respective the upper and lower edges of the upper seed box of a bulk seed box positioned proximal thereto.

It is an object of the present invention to provide an improved method and apparatus for breaking down seed boxes.

Other objects and advantages will become apparent from the following description of the preferred embodiment.

DESCRIPTION OF THE PREFERRED EMBODIMENT

Figure 1:
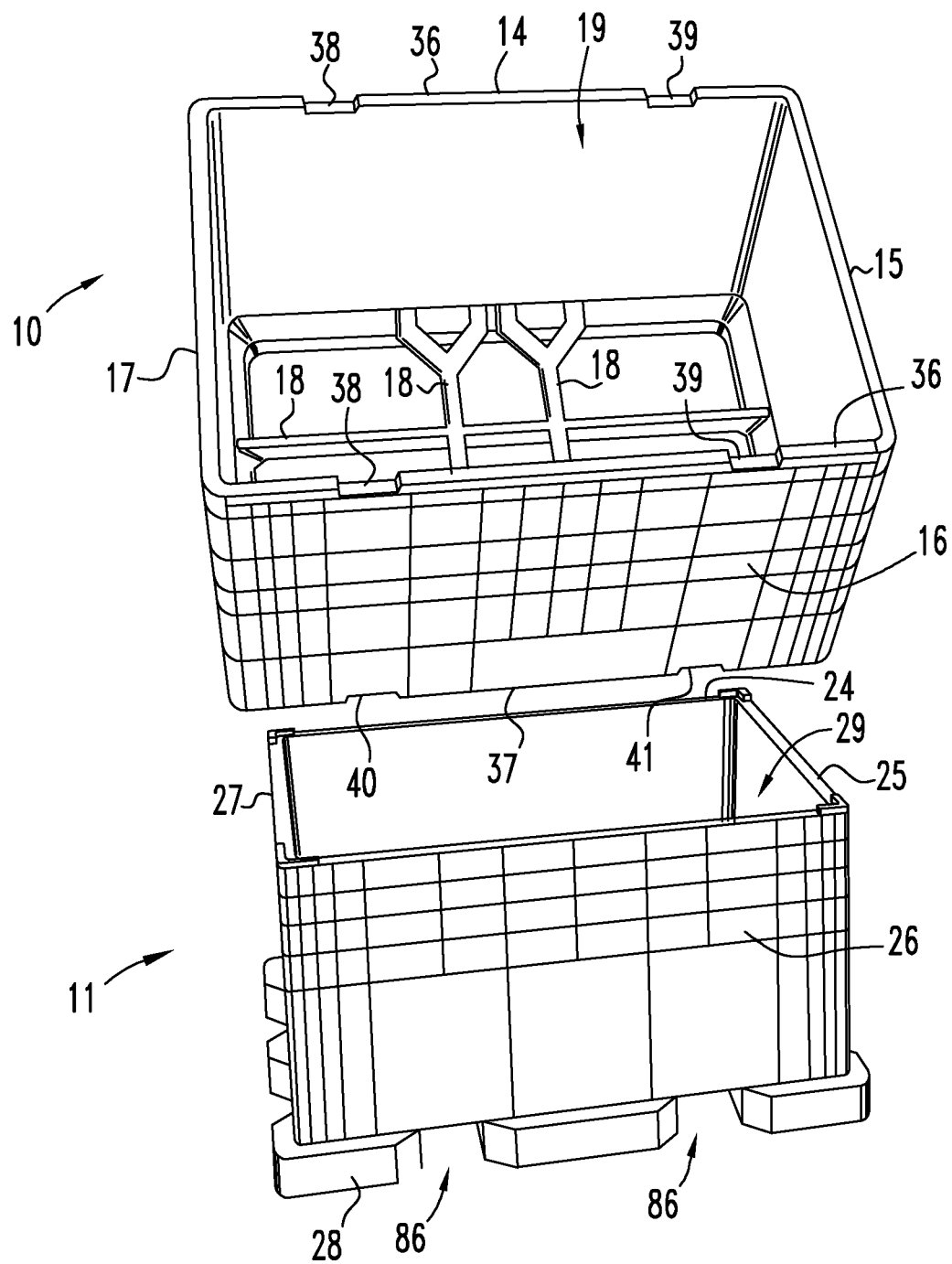
FIG. 1 is a perspective view of a set up upper 10 and lower 11 seed boxes of the type manipulated by the present invention.
Figure 2:
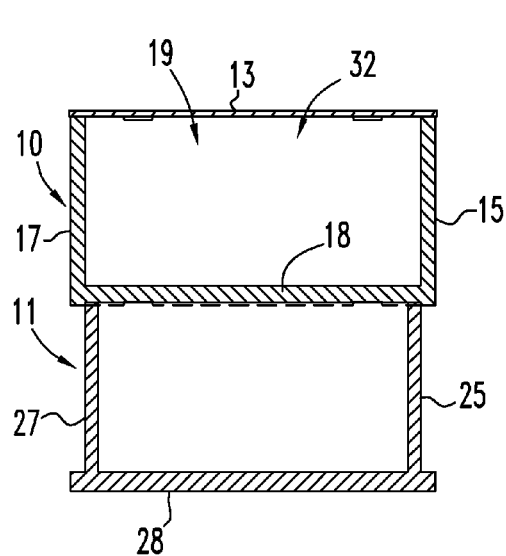
FIG. 2 is an elevation view representing the seed boxes 10 and 11 of FIG. 1 shown in stacked as a combined or bulk seed box 31.
Figure 3:
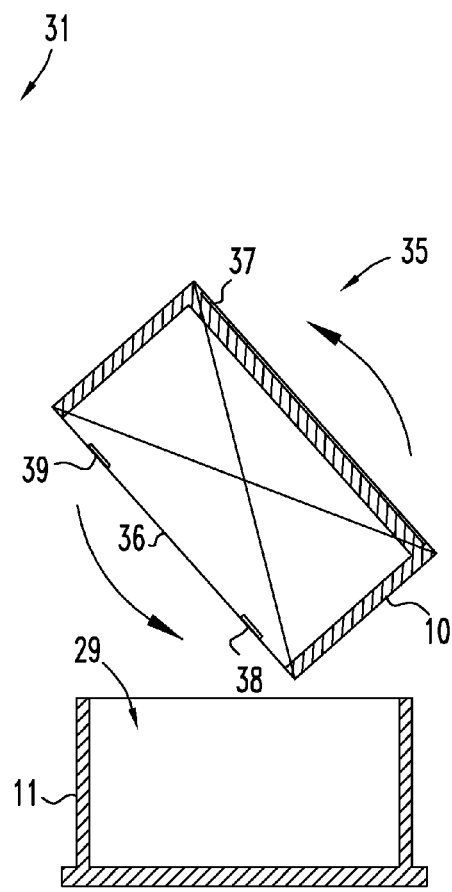
FIG. 3 is an elevation view of the seed boxes 10 and 11 of FIG. 2 with the upper box shown being flipped.
Figure 4:
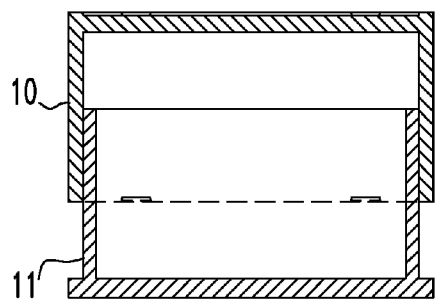
FIG. 4 is an elevation view of the seed boxes 10 and 11 of FIG. 2 with the upper seed box shown flipped and positioned partially down over lower seed box 11.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

Referring to FIGS. 1 through 5, there is shown in rough form a set of upper and lower seed boxes 10 and 11 and a lid 13. Upper box 10 has a generally rectangular shape with four walls 14-17, essentially no bottom except for several strengthening ribs, such as shown at 18, that extend between the bottoms of the walls 14-17, and an opening 19 in its top. Lower box 11 also has a generally rectangular shape with four walls 24-27, a solid bottom 28, and an opening 29 in its top. When upper box 10 sits atop and is locked to lower box 11 with its opening 19 pointing up, the resulting combined seed box or "bulk seed box" 31 (FIG. 2)—because the bottom of upper box 10 is largely completely open—defines a combined cavity 32 that holds in some embodiments about 2000 lbs. of seed. The mechanism for locking the upper and lower boxes together is not shown, but is well known in the art. Lid 13 is provided to cover the upper box 10, when desired.

Figure 5:
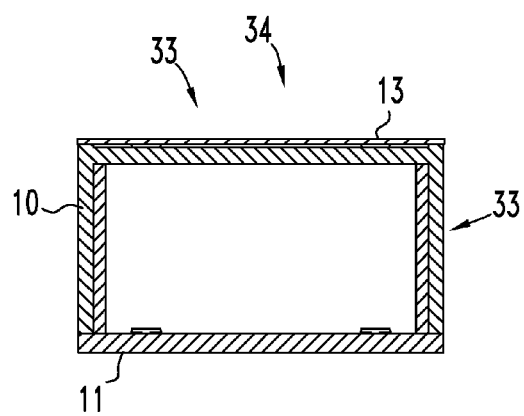
FIG. 5 is an elevation view of the seed boxes 10 and 11 of FIG. 2 with the upper seed box shown flipped and positioned all the way down over lower seed box 11, now as a nested box set.

Once empty of seed, bulk seed box 31 is stored until it can be returned to the seed vendor for re-use. Over time, these bulk seed boxes 31 can pile up, taking up a considerable and inconvenient amount of space. To reduce this spatial footprint, the bulk seed boxes are desired to be broken down. That is, upper box 10 is unlocked (not shown, but well known) from lower box 11, lifted up from lower box 11, flipped over (rotated, as at 35 in FIG. 3) 180 degrees so that its top opening 19 points down, and then lowered (FIG. 4) until it is all the way down, with the lower, smaller-dimensioned box 11 nested inside of the upper box 10 (FIG. 5). The two, now nested boxes (referred to as a nested box set 33 in a nested position 34) occupy about one half the space that they did when they were in their bulk seed box form 31. The lid 13 is applied to the bottom 18 (which now faces up) of upper box 10 (FIG. 5), and it is ready for storage until picked up or delivered back to the seed vendor.

Defined at each of the opposing upper and lower edges 36 and 37 of an opposing set of the walls 14 and 16 of upper box 10 are spaced-apart hand grip recesses 38 and 39 (in each upper edge 36) and 40 and 41 (in each lower edge 37). These grip recesses 38/39 and 40/41 provide a user with a convenient place to lift, carry and flip an upper box 10.

Figure 6:
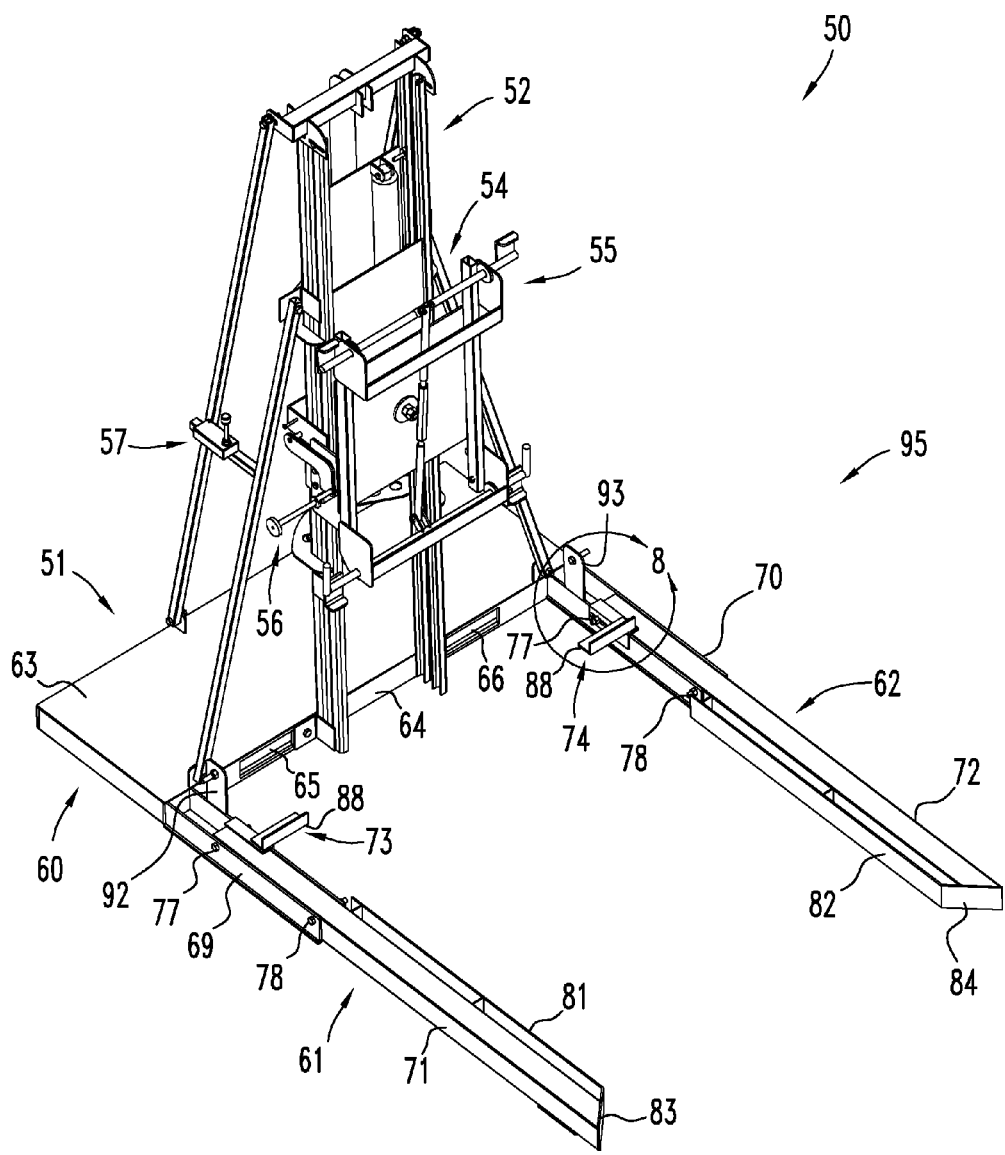
FIG. 6 is a left side perspective view of the apparatus 50 for manipulating seed boxes in accordance with one embodiment of the present invention.

Referring to FIG. 6, there is shown an apparatus 50 for breaking down or manipulating bulk seed boxes 31 in accordance with the present invention. Apparatus 50 generally includes a base assembly 51, a lift assembly 52, a swivel assembly 54, a clamp assembly 55, a height locator assembly 56 and a control assembly 57.

Base assembly 51 includes a base 60 and folding leg assemblies 61 and 62. Base 60 comprises an underlying frame covered by a deck plate 63 and including a front plate 64, which defines two, spaced-apart fork holes 65 and 66. Each leg assembly 61/62 includes a leg holder 69/70, a leg 71/72 and a box stop 73/74, respectively. Each leg holder 69/70 is U-shaped in cross-section and is rigidly mounted to and at opposing ends of front plate 64 to extend forwardly therefrom, as shown. The rear ends of legs 71/72 are received in the troughs defined by the U-shaped leg holders 69/70 and are secured thereto by rear bolts 77 and front bolts 78 (or similar fasteners). When used herein, bolts (such as rear bolts 77) inherently include companion nuts, washers, etc. to complete the apparent use of the bolt (or other fastener), such as connecting two or more parts together. Each leg 71/72 is provided with an inner bumper bar 81/82 that is affixed to the inside side of each leg 71/72 and that, along with its respective leg 71/72, is angled inwardly at its forward end (at 83/84). The bumper bars 81/82 are to absorb contact and any damage from the seed boxes and/or forklifts as the seed boxes are maneuvered into and out of position in apparatus 50.

Figures 7, 8:
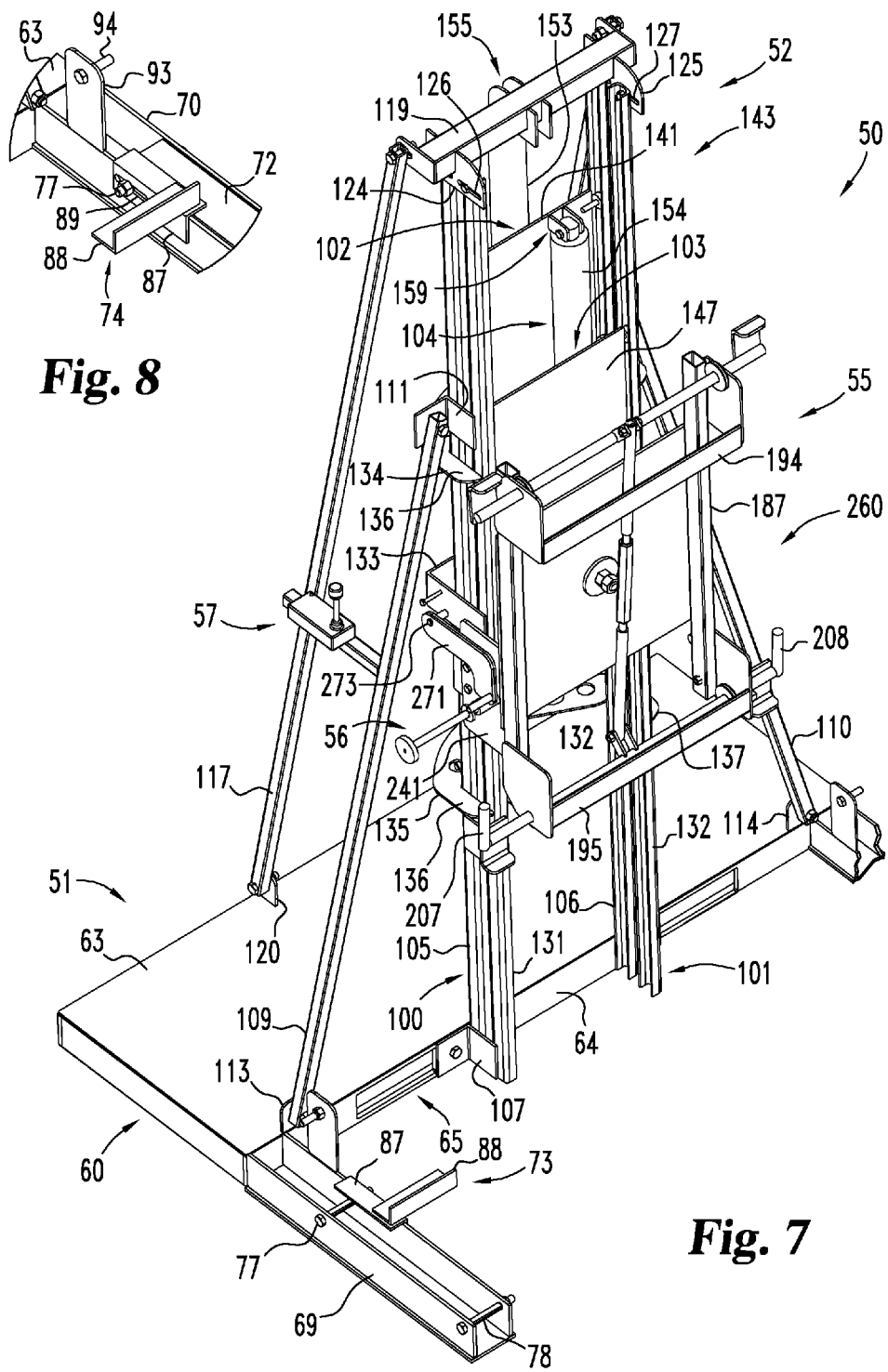
FIG. 7 is a left side perspective view of the apparatus 50 of FIG. 6 with portions of the leg assemblies 61 and 62 removed for discussion.
FIG. 8 is an enlarged view of a portion of the apparatus 50 of FIG. 6 and taken within the detail circle 8.

As used herein, the left and right sides of apparatus 50 and its components are as viewed in FIG. 7, with leg 71 being on the left and leg 72 being on the right, and front and forward refer to the direction toward leg ends 83/84 and rear and back refer to the direction toward deck 63.

Referring to FIGS. 6 and 8, the box stops 73 and 74 are mirror images of each other. Box stop 74 includes an L-shaped mount plate 87 and an L-shaped stop bar 88. Mount plate 87 defines an adjustment slot 89 through which extends the rear bolt 77, which thus both secures leg 72 to leg holder 70, but also tightly, but adjustably secures mount plate 87 to leg holder 70. Stop bar 88 is rigidly connected to mount plate 87 to extend inwardly therefrom, as shown. In use, when a bulk seed box 31 is maneuvered into position for manipulation by apparatus 50 (typically using a fork lift, the forks extending through the fork gaps 86 defined in the base 28 and perhaps into the fork holes 65 and 66), between leg assemblies 61 and 62, the stop bars 88 of box stops 73 and 74 are engaged by the leading edge (not shown) of the base 28 of lower box 11 and thus stop any further insertion of the box. By adjusting the longitudinal (front to back) position of stop bars 88 via the slot 89 and bolt 77, the bulk seed box 31 will be stopped at the proper position for the clamp tabs 203-206 of clamp assembly 55 to accurately and reliably engage the hand grip recesses 38-41 of upper box 10, as described herein.

Figure 9:
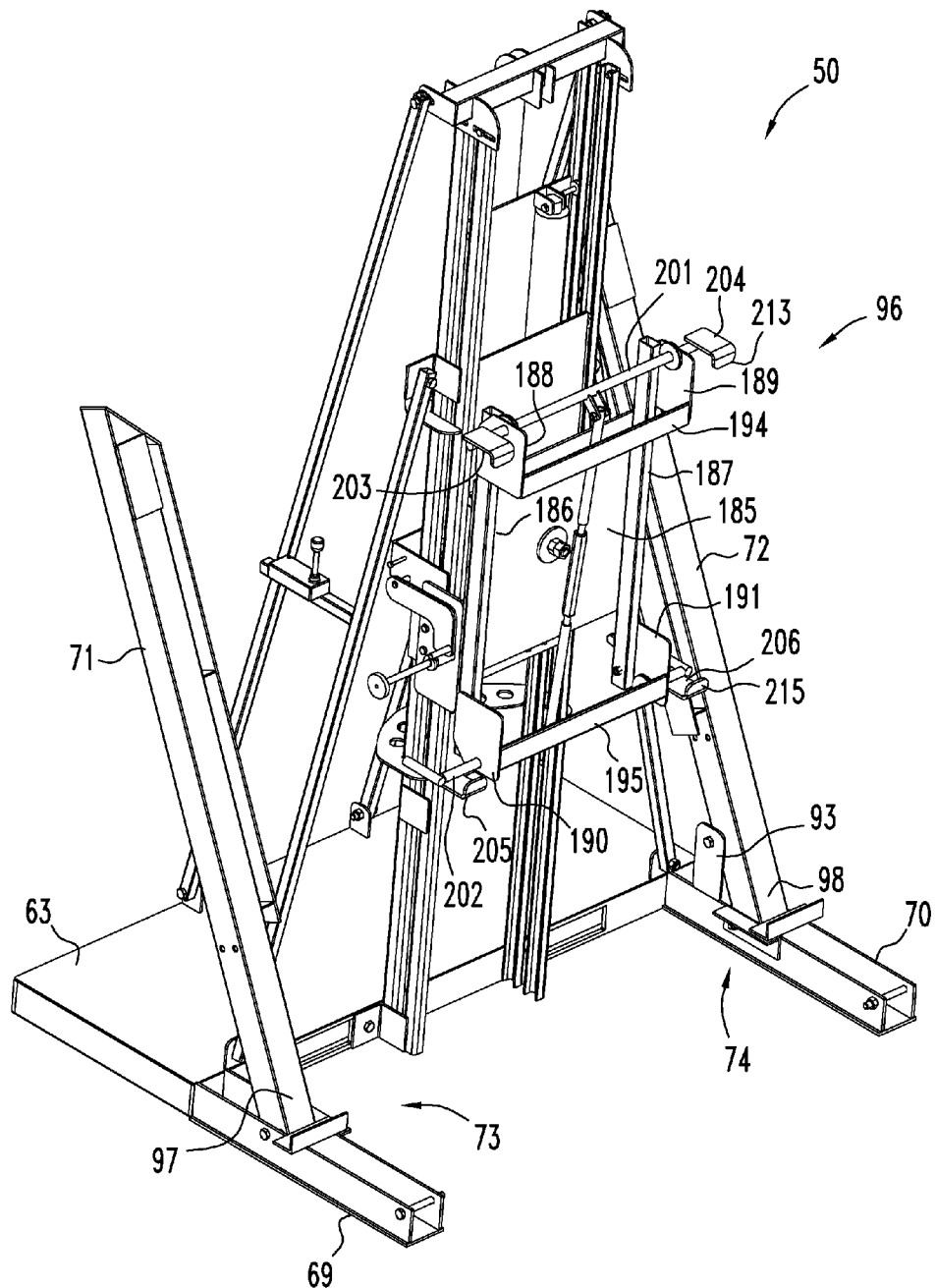
FIG. 9 is a left side perspective view of the apparatus 50 of FIG. 6 and with leg assemblies 61 and 62 shown in the up, storage position 96.
Figure 16:
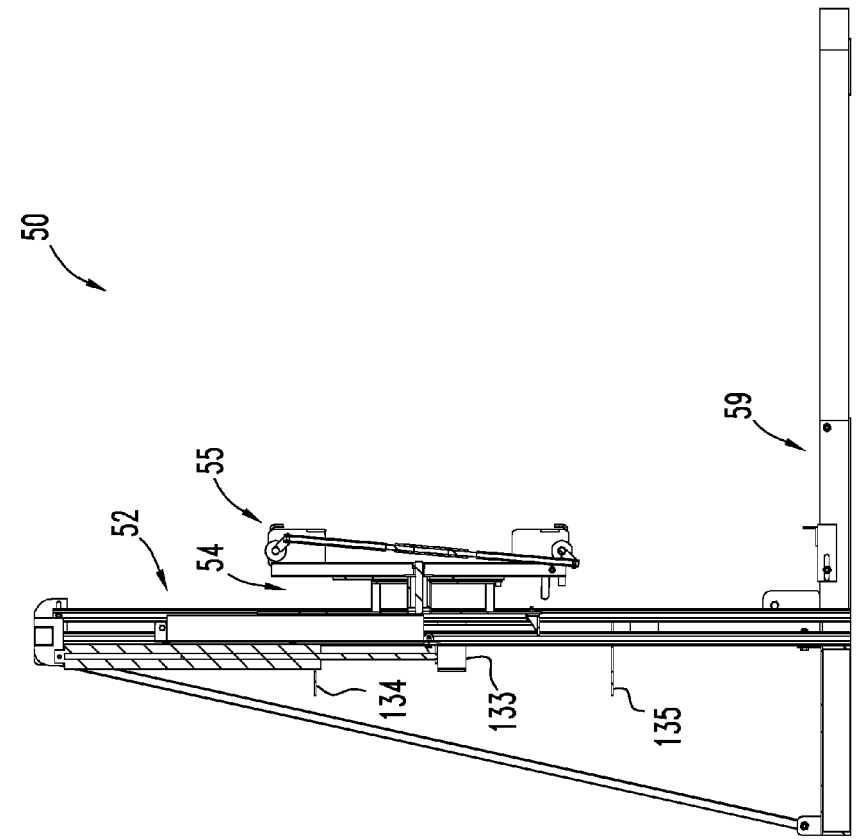
FIG. 16 is a side, cross-sectional view of the apparatus 50 of FIG. 10 taken along the lines 16-16 and viewed in the direction of the arrows.

Each leg holder 69/70 also includes a leg prop tab 92/93 rigidly extending up from such leg holder 69/70 and between deck plate 63 and the corresponding box stop 73/74. Extending outwardly from each tab 92/93 is a prop bar 94, as shown. During transport or storage, legs 71 and 72 can be pivoted from their down, use positions 95 (FIG. 6) to an up, storage position 96 (FIG. 9). To do so, rear and front bolts 77 and 78 and box stops 73 and 74 are removed. Legs 71 and 72 are pivoted to their transport position (shown in FIG. 9); box stops 73 and 74 are swapped and moved up against the now forward (bottom) sides 97 and 98 of legs 71 and 72, respectively (via their adjustment slots 89). Bolts 77 and 78 (and their nuts or other fastener) are then reinstalled and tightened, which thus hold legs 71 and 72 in a generally firm, non-moving position, between prop bars 94 and box stops 73 and 74, respectively.

Figure 10:
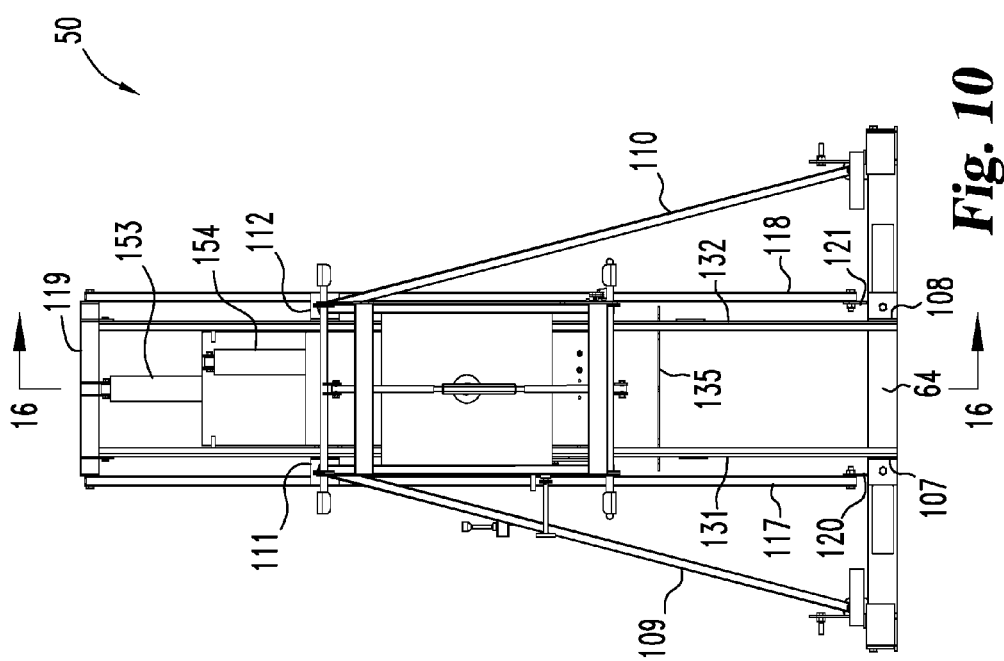
FIG. 10 is an elevation view of the apparatus 50 of FIG. 6.
Figure 11:
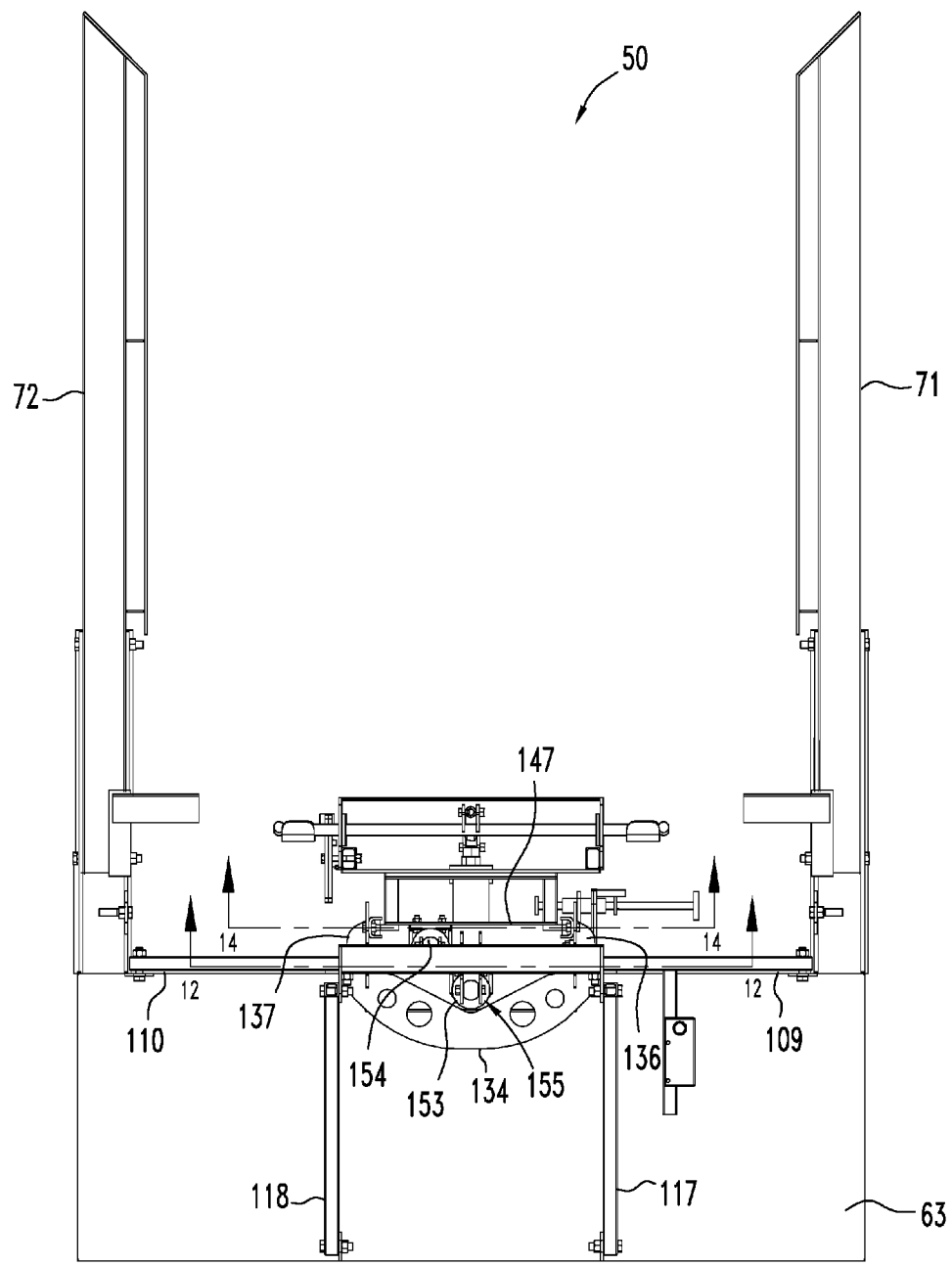
FIG. 11 is a top view of the apparatus 50 of FIG. 6.

Referring to FIG. 7 and also to FIGS. 10 and 11, lift assembly 52 is mounted to said base assembly 51, is for selective raising and lowering clamp assembly 55 and includes a first (rear) guide assembly 100, a second (front) guide assembly 101, a rear plate assembly 102, a front plate assembly 103 and motive means 104 for moving the plate assemblies 102 and 103 within rear and front guide assemblies 100 and 101, respectively. The components of lift assembly 52 act together to move the swivel assembly 54 up and down, as described below.

Rear guide assembly 100 includes a pair of opposing vertical channels 105 and 106 that are C-shaped in cross-section and are held in equidistant, parallel alignment at their bottoms by brackets 107 and 108 (FIGS. 7 and 10) to front plate 64; at an upper midpoint by side struts 109 and 110 extending from brackets 111 and 112 at such midpoint down to brackets 113 and 114 mounted to opposite sides of deck plate 63; and at their tops by rear struts 117 and 118 extending from a common cross tube 119 and down to brackets 120 and 121 mounted to the rear of deck plate 63. Cross tube 119 includes opposing top brackets 124 and 125 that define slots (two shown at 126 and 127 for front guide assembly 101 in FIG. 7) at which are mounted the tops of vertical channels 105 and 106. The slots permit vertical channels 105 and 106 to be adjusted to the proper vertical and mutually parallel alignment relative to the vertical channels 131 and 132 of front guide assembly 101.

Front guide assembly 101 likewise includes a pair of opposing vertical channels 131 and 132 that are identical to rear channels 105 and 106 and are held in equidistant, parallel alignment at their bottoms, midpoints and top by the same brackets 107/108 and side struts 109/110 and rear struts 117/118 via cross tube 119. Also holding vertical channels 105/106 and 131/132 in the proper spaced, parallel and vertical alignment are C-shaped box rib 133 and upper and lower width plates 134 and 135. Box rib 133 connects both pairs of vertical channels 105/106 and 131/132 together and provides for mounting of other components, as described below. Upper and lower width plates 134 and 135 are generally C-shaped, each with side arms 136 and 137, that are rigidly connected over the outsides of vertical channels 105/106 and 131/132, as shown, to ensure that those channels do not bow outwardly.

Figure 12:
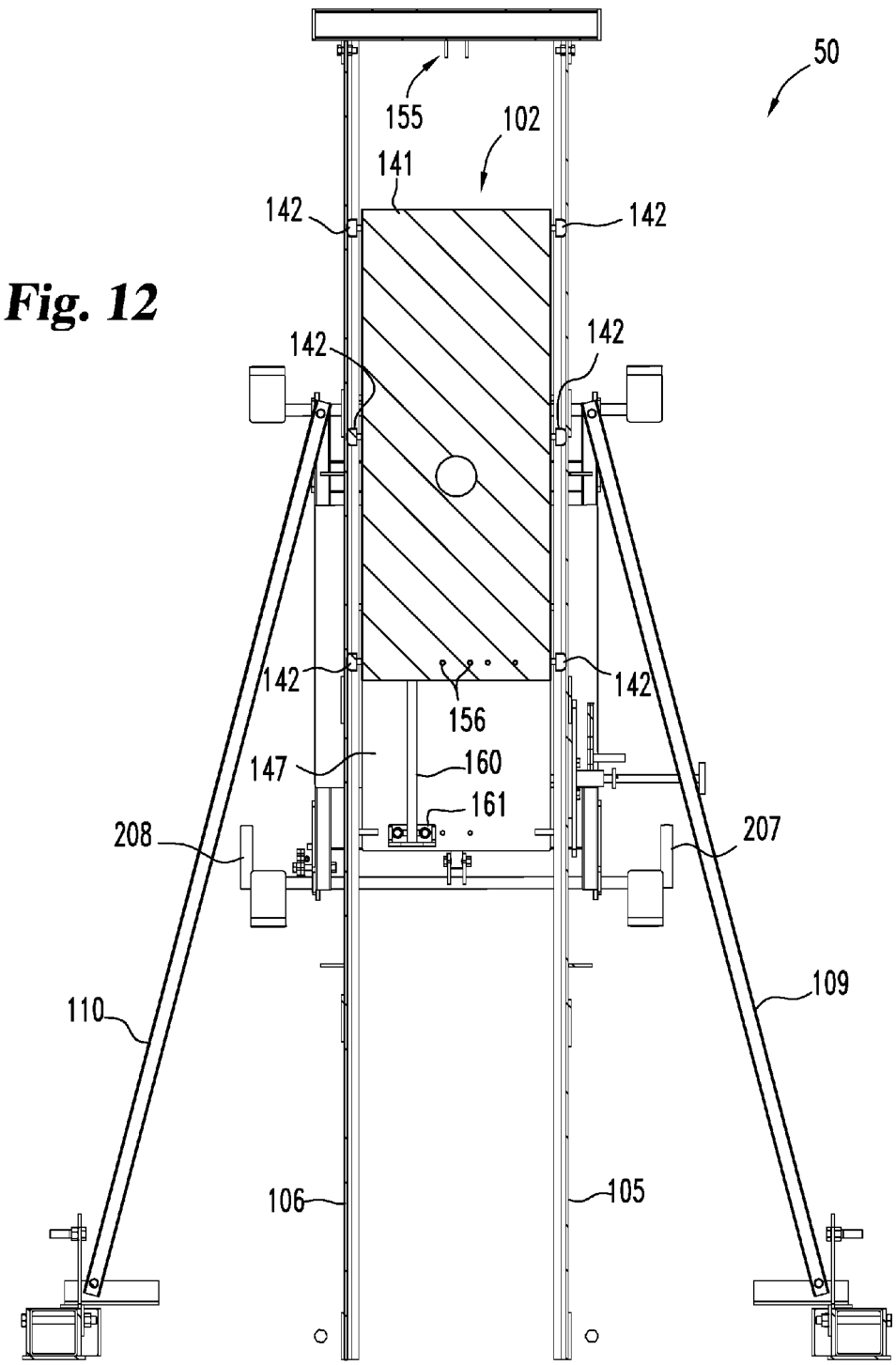
FIG. 12 is a cross-sectional view of the apparatus 50 of FIG. 11 taken along the lines 12-12 and viewed in the direction of the arrows.
Figure 13:
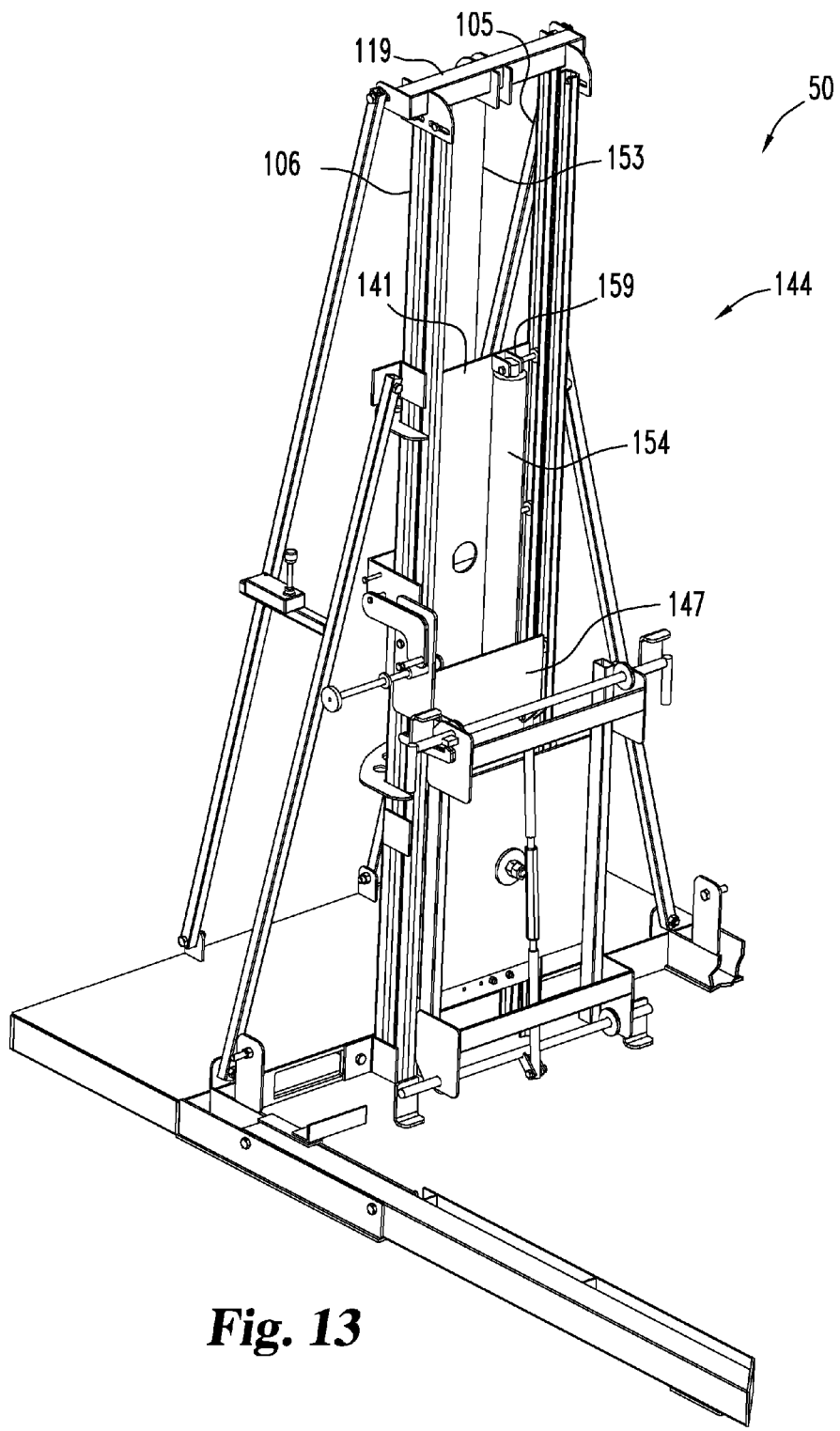
FIG. 13 is a left side perspective view of the apparatus 50 of FIG. 6 with a portion of leg assembly 62 removed for discussion and shown in the lower position 144.
Figure 25:
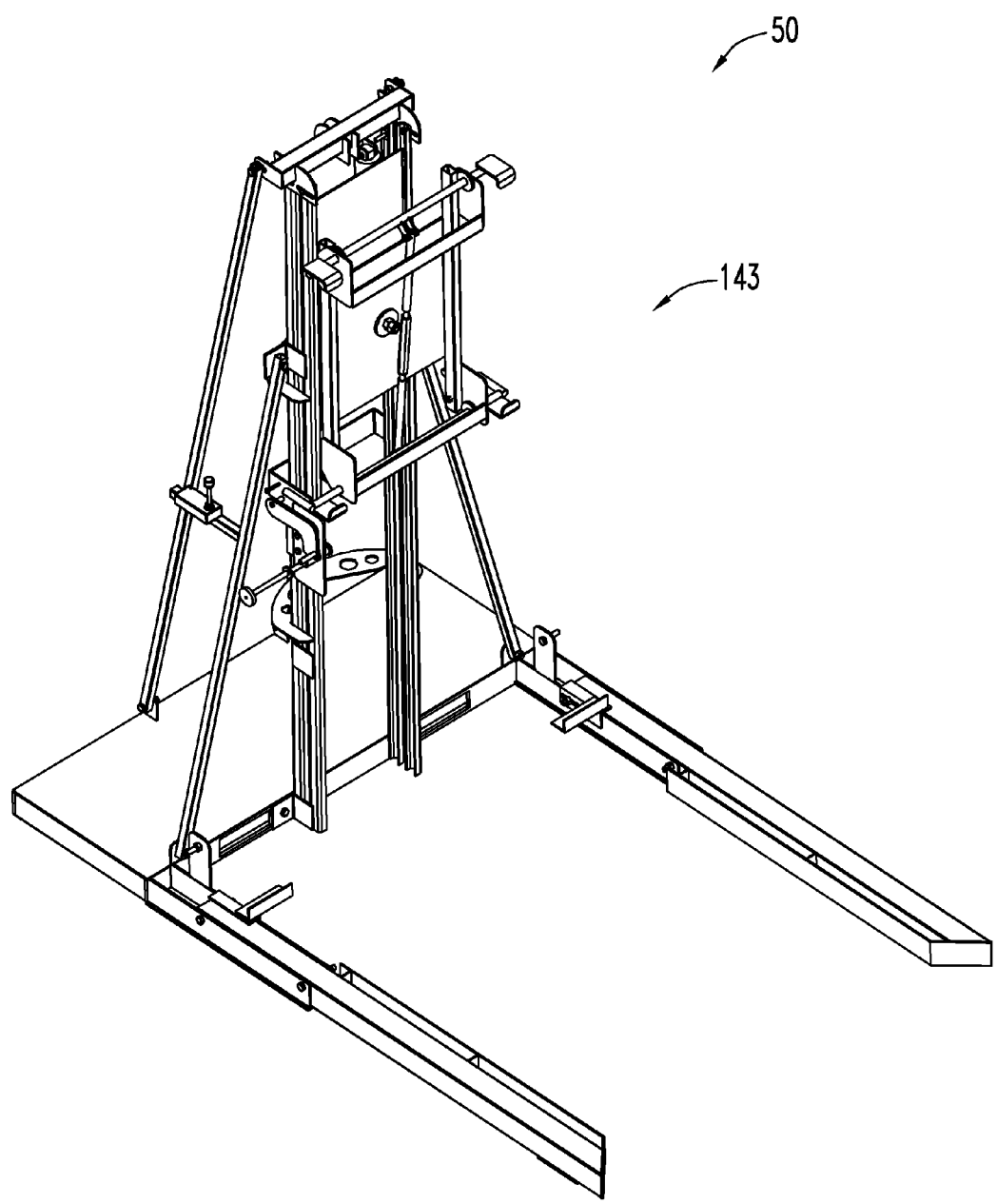
FIG. 25 is a left side perspective view of the apparatus 50 of FIG. 6 and shown in the upper position 144.

Referring to FIGS. 11, 12 and 13, rear plate assembly 102 includes a rear plate 141 with six rollers 142 connected to it, three on each side, with one pair at top, one pair in the middle and one pair at the bottom. The six rollers 142 are sized and spaced to ride within the vertical channels 105 and 106 of rear guide assembly 100 and thus hold rear plate 141 for vertical movement along rear channels 105 and 106 among an upper position 143 (FIG. 25), a lower position 144 (FIG. 13) and a home position 260 (FIG. 7).

Figure 14:
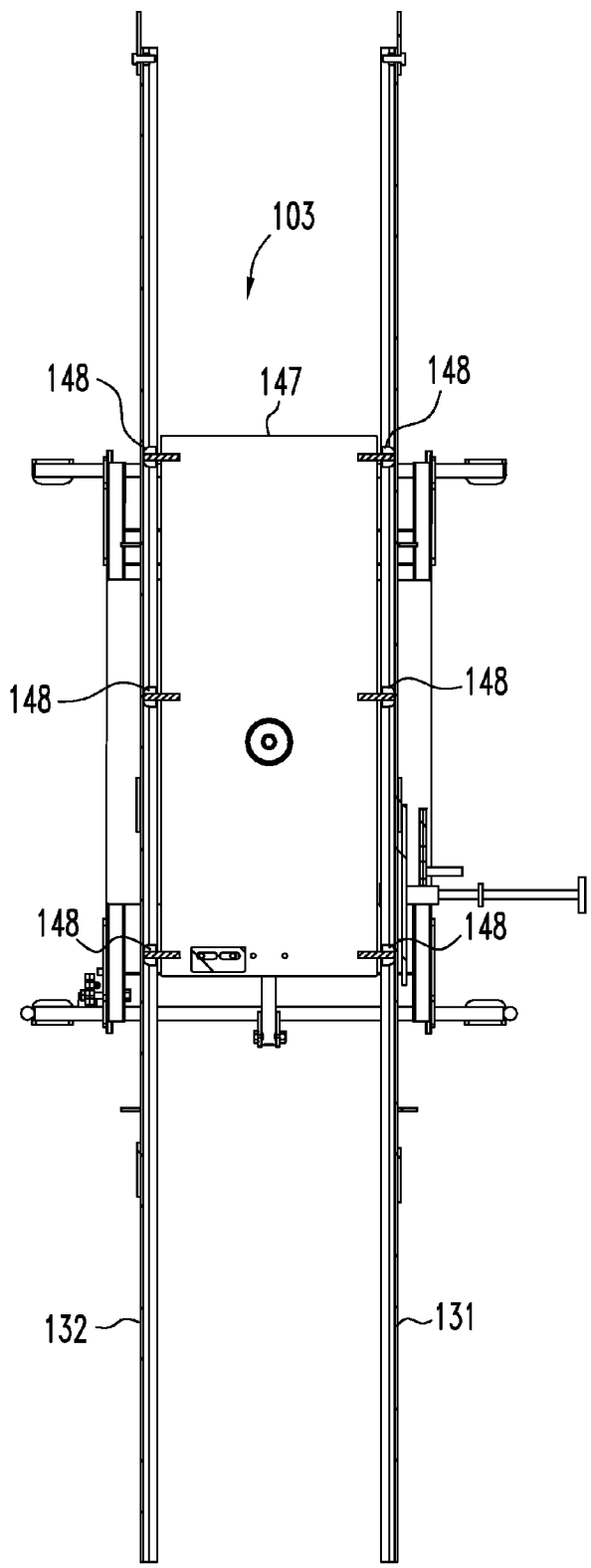
FIG. 14 is a cross-sectional view of the apparatus 50 of FIG. 11 taken along the lines 14-14 and viewed in the direction of the arrows.

Referring to FIGS. 11, 13 and 14, front plate assembly 103 includes a front plate 147, also with six rollers 148 connected to it, three on each side, with one pair at top, one pair in the middle and one pair at the bottom. The six rollers 148 are sized and spaced to ride within the vertical channels 131 and 132 of front guide assembly 101 and thus hold front plate 147 for vertical movement within and along front channels 131 and 132 among the upper position 143 (FIG. 25), lower position 144 (FIG. 13) and home position 260 (FIG. 7). As shown, in the upper position 143, rear plate 141 is at the same height as front plate 147, and at the lower position 144, rear plate 141 has not descended as low as front plate 147.

The motive means 104 for moving the rear and front plate assemblies 102 and 103 includes first (rear) and second (front) double-acting pneumatic cylinders 153 and 154 and a pneumatic power source (not shown) supplying air under pressure to the cylinders 153 and 154. Rear cylinder 153 is connected between cross tube 119 (at brackets 155, FIG. 7)) at its top and at its bottom to the bottom of rear plate 141 (via a bracket, not shown, at holes 156, FIG. 12). Front cylinder 154 is connected between the top of rear plate 141 (at brackets 159, FIG. 13) at its top and at its bottom (via its output rod 160, FIG. 12) to the bottom of front plate 147 (at bracket 161). The cylinders 153 and 154 are connected in parallel with the pressure source to share equally the air pressure upon activation of the pressure source, which action causes retraction of the cylinders 153 and 154, which raises both rear and front plates 141 and 147. To extend cylinders 153 and 154 and thus lower connected plates 141 and 147, the pressure is vented, which permits the cylinders and the rear and front plates to fall freely due to gravity. Alternative embodiments are contemplated where either or both cylinders 153 and 154 are connected as double acting cylinders so that both the up and down modes are powered (as opposed to the down stroke being gravity driven).

Alternative embodiments are contemplated wherein the first and second guide assemblies 101 and 102 are combined into a single guide assembly, with just a single mount plate and motive means (i.e. a single cylinder or similar device for moving the single mount plate). Also, the rear plate 141 and/or other components of apparatus 50 are contemplated to have other shapes and configurations, so long as they perform the described function. For example, plate 141 could instead comprise only an I-shaped frame with an upper set of opposing rollers 142 and a lower set of opposing rollers 142, and with the two cylinders 153 and 154 attached in roughly the same positions as with plate 141.

Figure 15:
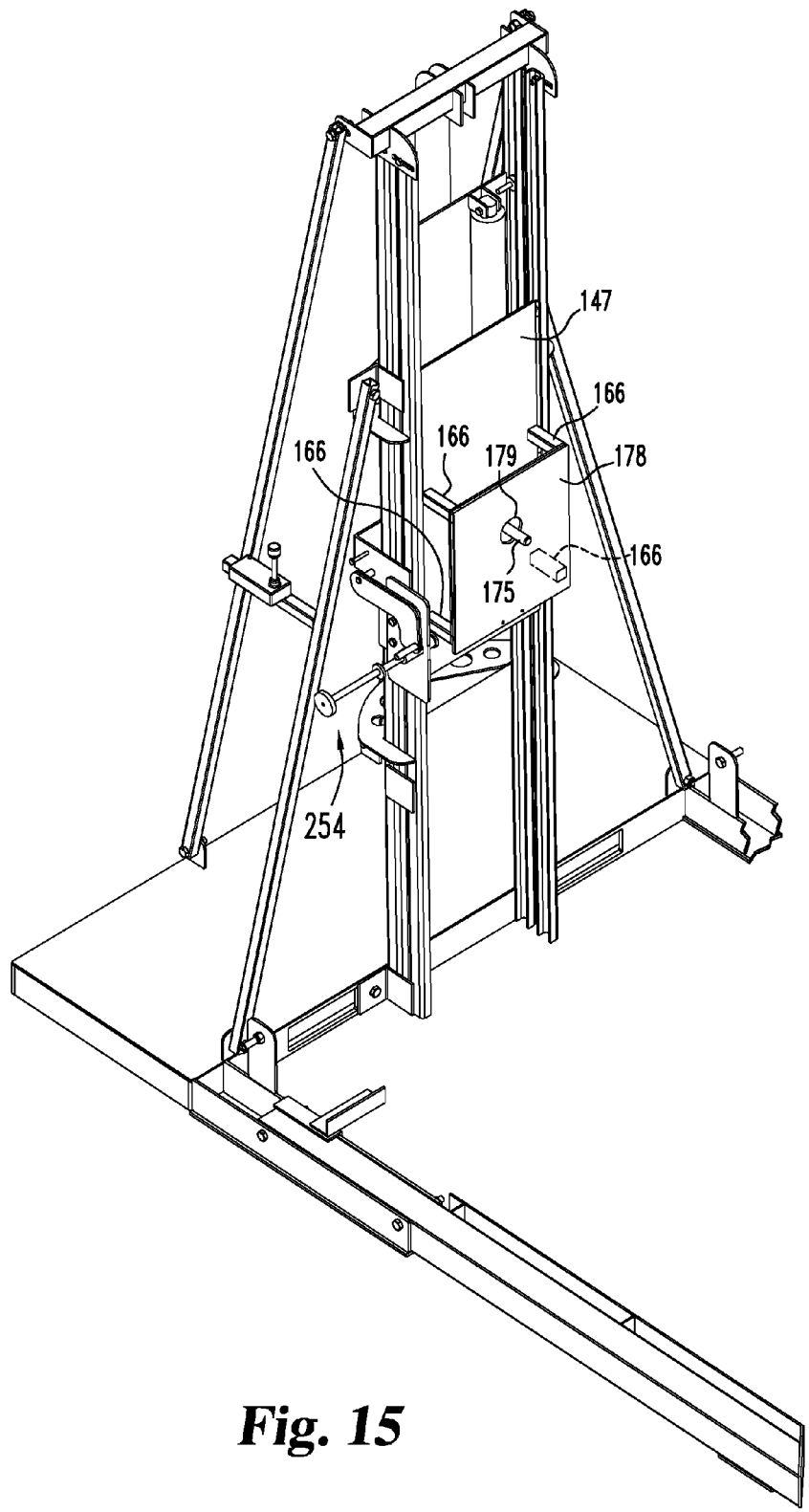
FIG. 15 is a left side perspective view of the apparatus 50 of FIG. 6 with a portion of leg assembly 62, clamp assembly 55 and the pivot plate 185 of mounting frame 180 removed for discussion and shown in the home position 260.
Figure 17:
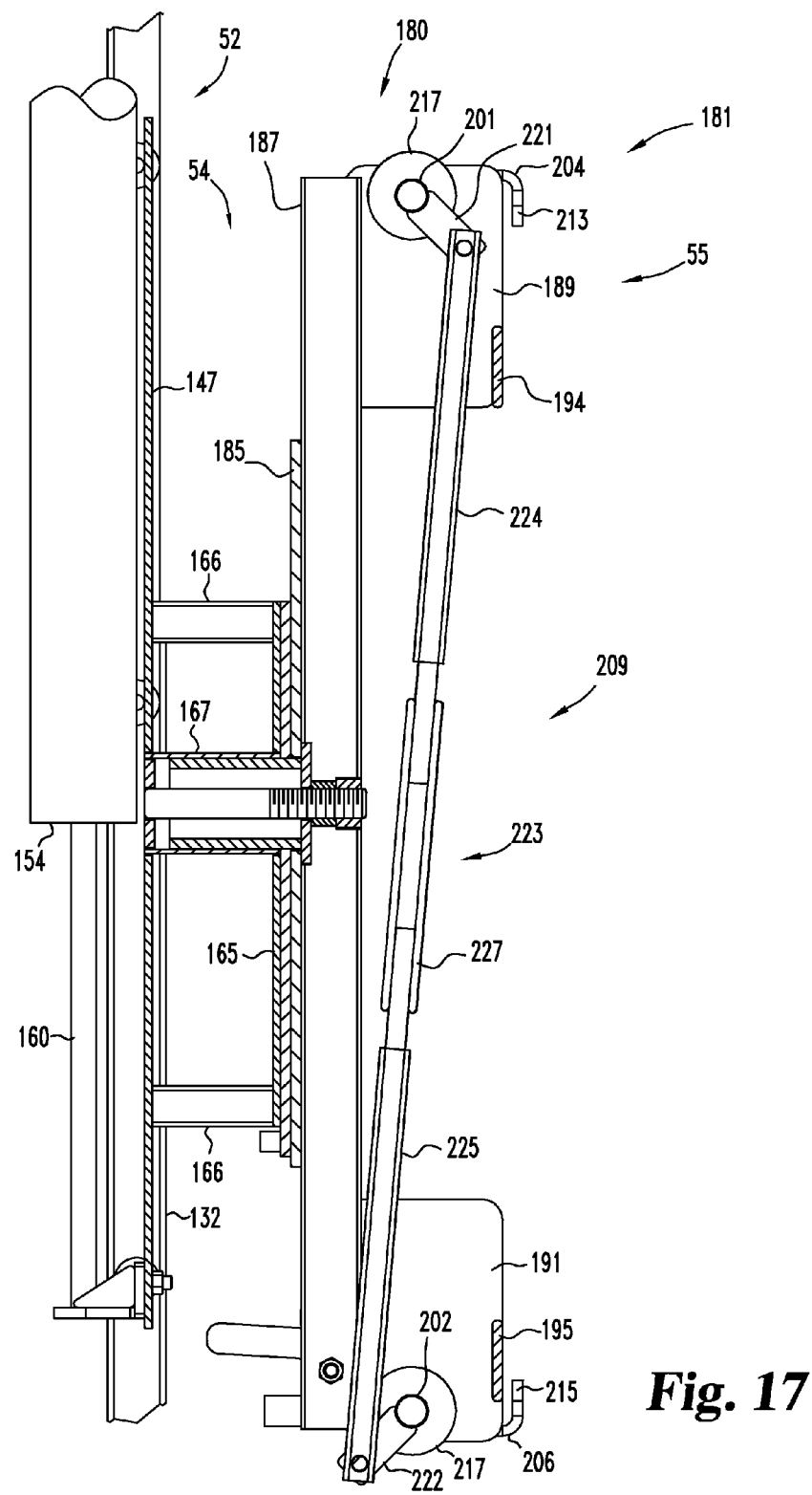
FIG. 17 is an enlarged side view of a portion of the apparatus 50 of FIG. 16 showing the swivel assembly 54, the clamp assembly 55 and a portion of the lift assembly 52.
Figure 18:
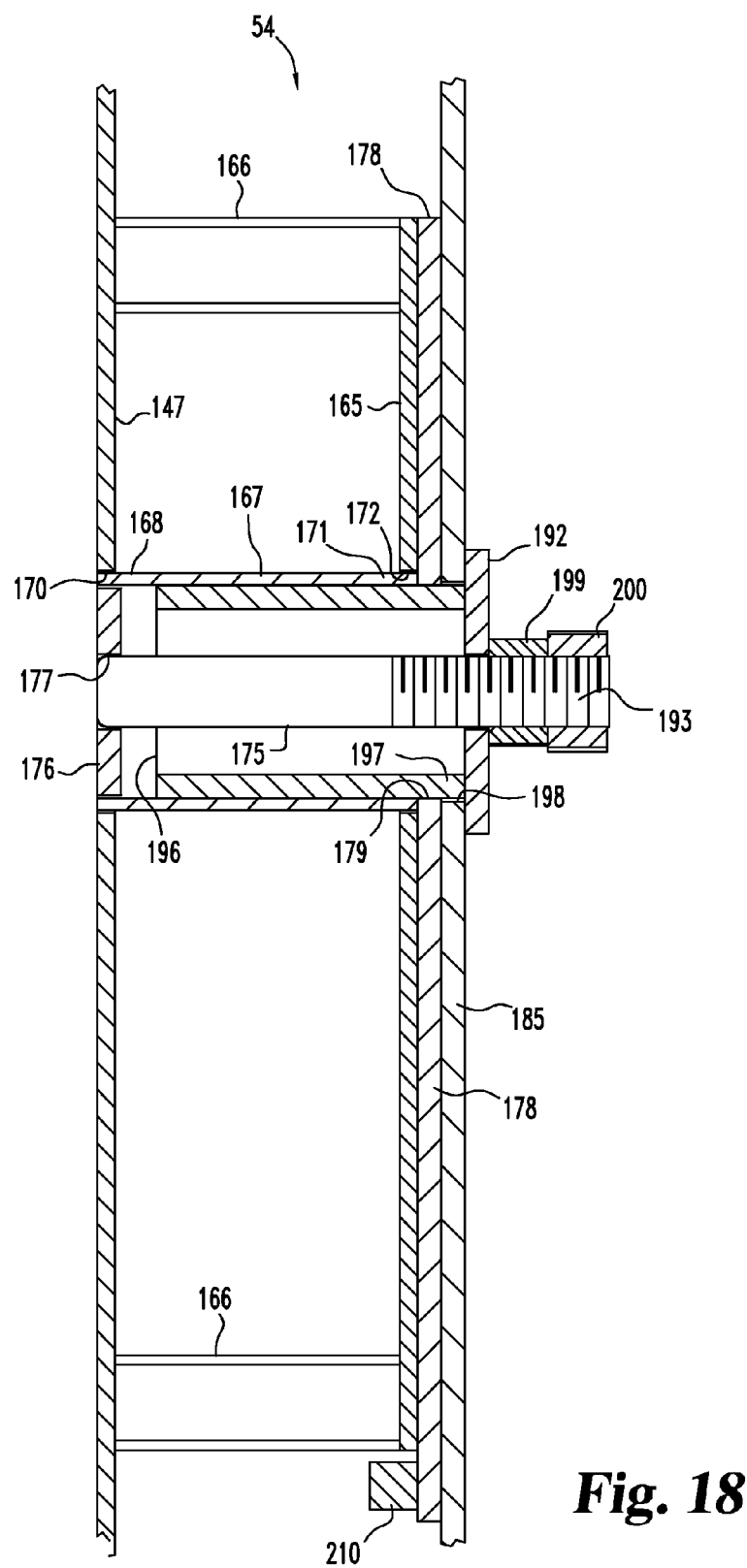
FIG. 18 is an enlarged side view of the portion of the apparatus 50 of FIG. 17 showing primarily the swivel assembly 54.

Referring to FIGS. 17 and 18, as well as FIGS. 7 and 15, swivel assembly 54 mounts the clamp assembly 55 to front plate 147, and thus to lift assembly 52. Swivel assembly 54 includes a backer plate 165, four mounting arms 166 and an outer swivel tube 167. The four mounting arms 166 are connected—one to each corner of the back side of rectangular backer plate 165—to rigidly mount backer plate 165 to, parallel to and spaced forwardly of front plate 147, as shown. The rear end 168 of outer swivel tube 167 is received in a hole 170 defined in front plate 147 and is rigidly connected thereto, and the front end 171 of swivel tube 167 is received in a hole 172 defined in backer plate 165 and is rigidly connected thereto. A part rigidly connected to another part can be connected in any manner appropriate for such parts. Thus, swivel tube 167 is contemplated to be welded to front plate 147 and backer plate 165, but other similar manners of connection are acceptable so long as they rigidly and reliably hold the particular parts together. A threaded mounting pin 175 is rigidly connected to a mounting disc 176 (here, welded to and within a hole of disc 176, at 177), which is rigidly connected to the rear end 168 and inside of swivel tube 167. Mounting pin 175 extends from disc 176 through and forwardly of swivel tube 167 and backer plate 165, as shown. A low friction spacer plate 178 is positioned against the front side of backer plate 165 and defines a hole 179 that has a diameter the same or slightly larger than the inner diameter of swivel tube 167. In assembly, low friction spacer plate 178 is loosely supported by the inner mounting pipe (described below) In one embodiment, spacer plate 176 is made of Dekin® thermoplastic.

Referring to FIGS. 9, 17 and 18, clamp assembly 55 includes a mounting frame 180, a gripping assembly 181 for clamping onto a seed box 10, and a locking assembly 182 (FIG. 19) for holding the gripping assembly 181 locked onto the seed box 10 while it is being manipulated—that is, lifted, flipped and lowered to the desired position relative to the lower seed box 11. The gripping assembly 181 brings opposing clamp tabs 203-206 together to clamp, grip and hold the seed box.

Mounting frame 180 includes a pivot plate 185, left and right frame members 186 and 187 connected to opposing sides of the front of pivot plate 185, and four bar plates that comprise two opposing upper bar plates 188 and 189 extending forwardly from the top ends of frame members 186 and 187 and two opposing lower bar plates 190 and 191 extending forwardly from the bottom ends of frame members 186 and 187, as shown. Extending between and at the front sides of the upper bar plates 188 and 189 is an upper stop bar 194 and between and at the front sides of the lower bar plates is a lower stop bar 195. Upper bar plates 188/189 define aligned holes (not shown) through which extends the upper clamp bar 201, and lower bar plates 190/191 define aligned holes (not shown) through which extends the lower clamp bar 202, as described below. Pivot plate 185 includes an inner mounting pipe 196 (FIG. 18), the forward end 197 of which is received in a hole 198 defined somewhat centrally in pivot plate 185 and is there rigidly connected to pivot plate 185.

In assembly, low friction spacer plate 178 is applied against the back side of pivot plate 185, with mounting pipe 196 extending through the hole 179 of plate 178. The clamp assembly 55, which includes pivot plate 185, is then mounted to the swivel assembly 54 by telescopically inserting the inner mounting pipe 196 of pivot plate 185 into outer swivel tube 167 (the respective outer and inner diameters of which are very close) until the low friction plate 178 rests against backer plate 165 and is then sandwiched between backer plate 165 and pivot plate 185. A limit block 210 is attached to the backside, at the bottom of low friction plate 178 (FIG. 18), just a short distance below backer plate 165. In this configuration, low friction plate 178 is supported by and can freely rotate just a small bit about mounting pipe 196. A large washer 192 is applied over the threaded, outboard end 193 of mounting pin 175 that now extends forwardly of the front side of pivot plate 185, and two nuts 199 and 200 are applied to the threaded end 193 to hold pivot plate 185 in this position. This position includes the pivot plate 185 not being tightly compressed against the low friction plate 178, but only firmly or gently against it so that pivot plate 185 and its clamp assembly 185—along with a seed box 10 that may be held thereby—is otherwise free to rotate against the low friction disc 176 and about the common, horizontal axes of outer swivel tube 167, mounting pin 175 and mounting pipe 196.

Alternative embodiments are contemplated wherein the lift assembly 52, swivel assembly 54 and/or clamp assembly 55 are structured to lift the seed box and then to rotate it about an axis that is not truly horizontal. For example, guide assemblies 100 and 101 could be slightly arced or bent, thus causing the clamping assembly to arc or tilt back as it rises, which could reduce the height needed to raise the seed box 10 before it can be rotated. Thus, reference to rotation of clamp assembly and/or seed box 10 about a horizontal axis contemplates and encompasses rotation about an axis that is not perfectly horizontal.

Figures 19, 19A:
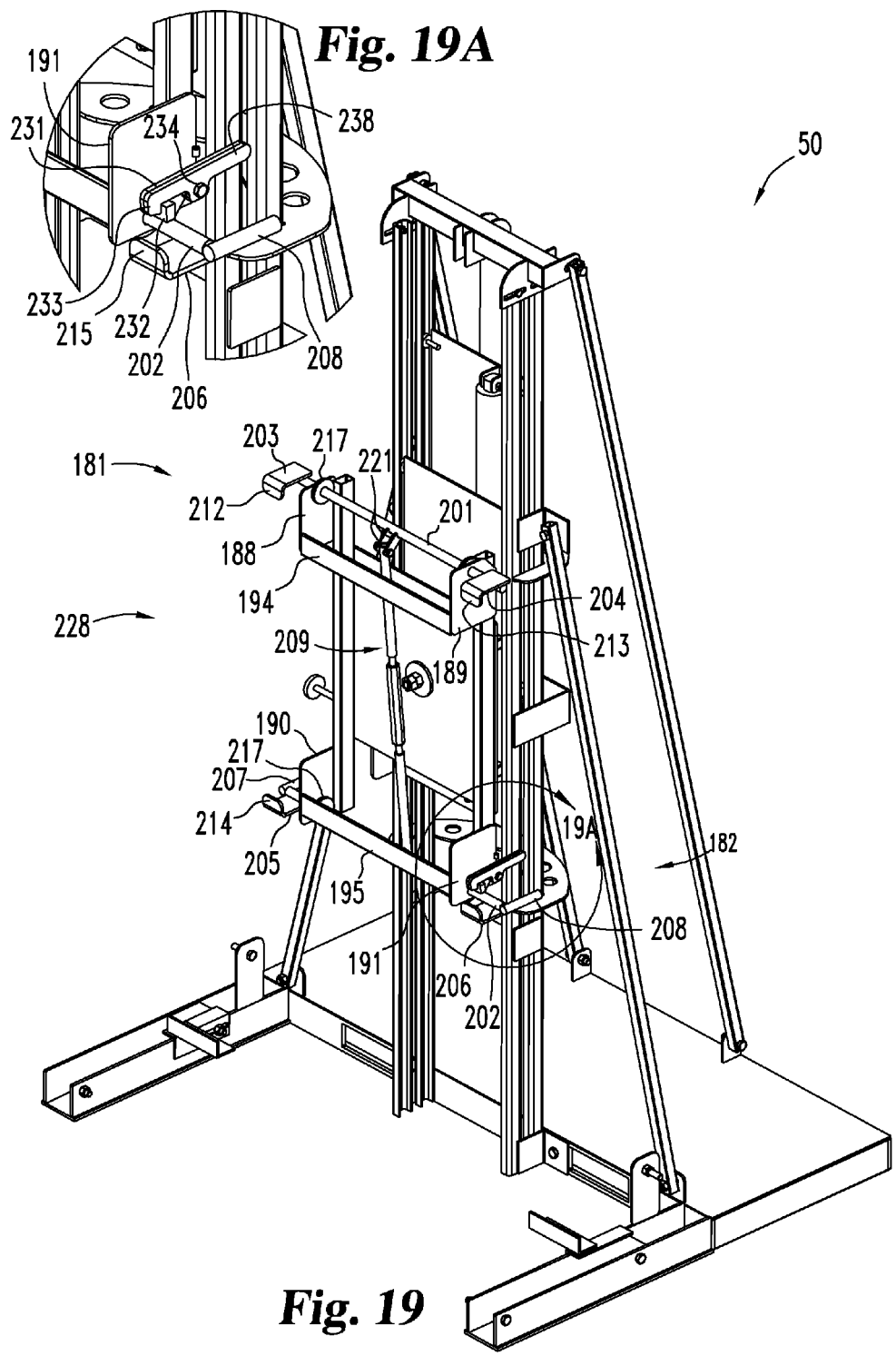
FIG. 19 is a right side perspective view of the apparatus 50 of FIG. 6 and with portions of the leg assemblies 61 and 62 removed for discussion.
FIG. 19A is an enlarged view of a portion of the apparatus 50 of FIG. 19 and taken within the detail circle 19A.

Referring to FIGS. 9 and 19, gripping assembly 181 includes upper and lower clamp bars 201 and 202, upper clamp tabs 203 and 204, lower clamp tabs 205 and 206, handles 207 and 208, and coordination assembly 209. Upper clamp bar 201 extends through the holes (not shown) defined in upper bar plates 188 and 189 and is thus held in a horizontal upper gripping position, and lower clamp bar 202 likewise extends through the holes (not shown) defined in lower bar plates 190 and 191 and is thus held in a horizontal lower gripping position parallel to the upper gripping position, as shown. The upper clamp tabs 203 and 204 are rigidly mounted at inboard ends to and at the opposite ends of the upper clamp bar 201, and they extend therefrom forwardly about three inches to their outboard ends whereupon they angle downward to form hooks 212 and 213, respectively. The portion of each clamp tab 203-206 between its rigid connection to its corresponding clamp bar 201/202 and the hook 212-215 at its outboard end is referred to as its main body. Lower clamp tabs 205 and 206 are similarly rigidly mounted to and at the opposite ends of the lower clamp bar 202, and they extend therefrom upwardly about four inches whereupon they angle upward to form hooks 214 and 215, respectively. Each of the upper and lower clamp bars 201 and 202 are held in the proper left-to-right alignment by locking discs 217 that are fixed in a position around the bars 201/202 and up against, or nearly against, the insides of the respective bar plates (188/189 for the upper clamp bar 201 and 190/191 for the lower clamp bar 202).

Referring to FIGS. 17 and 19, clamp bars 201/202 (and their clamp tabs 203-206) can each pivot about their axes and do so in unison due to the coordination assembly 209, which includes (two) linkage arms 221 extending generally forwardly from upper clamp bar 201 and (two) linkage arms 222 extending generally rearwardly from lower clamp bar 202. Adjustment means for adjusting the relative angular positions of the upper and lower clamp bars 201/202 is provided in an adjustable link 223 that extends between the outboard ends of the linkage arms 221 and 222. Adjustable link 223 includes an upper linkage tube 224 connected to upper linkage arms 221, a lower linkage tube 225 connected to lower linkage arms 222, and a turnbuckle 227 threadedly extending between the upper and lower linkage tubes 224 and 225.

Figure 20:
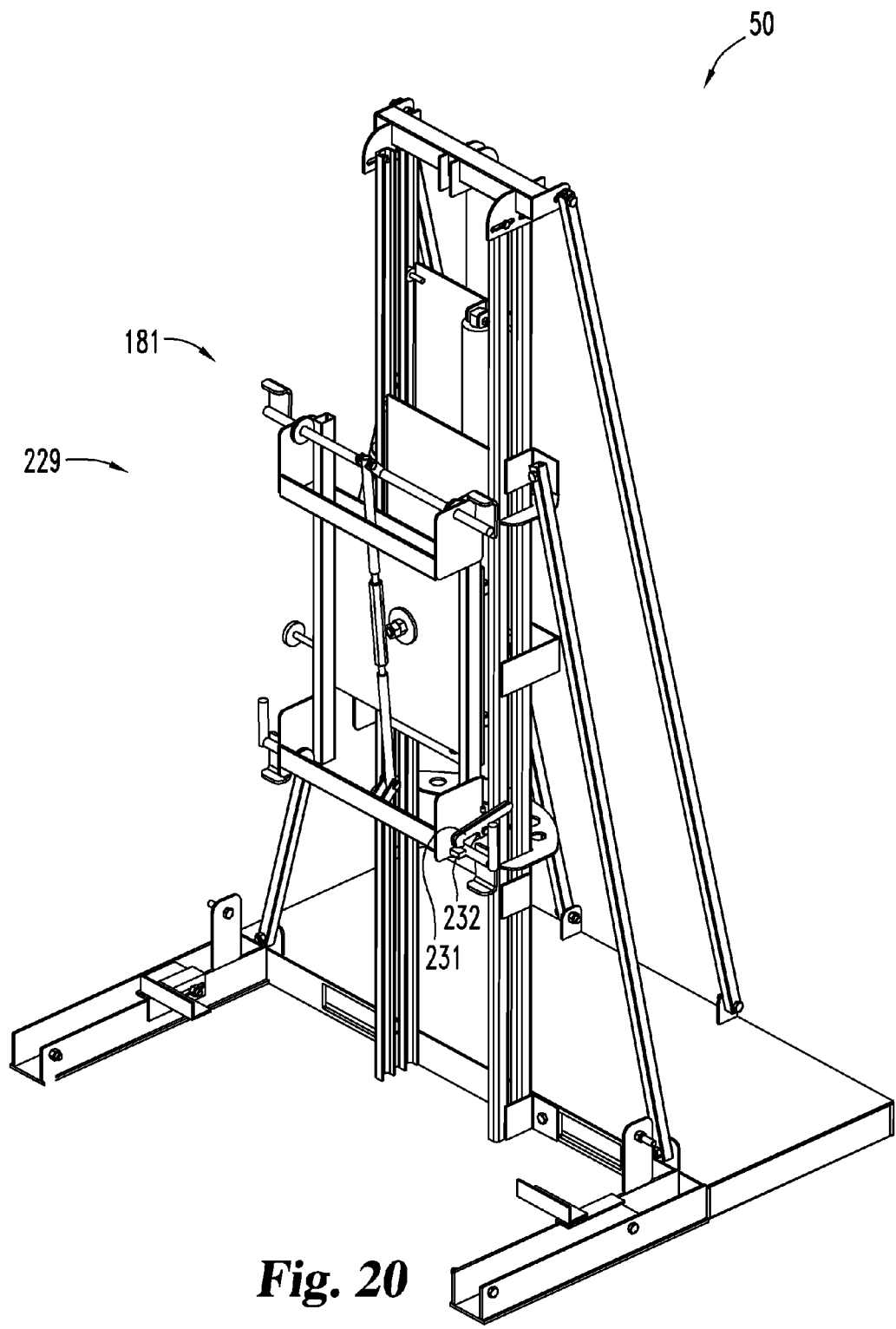
FIG. 20 is a right side perspective view of the apparatus 50 of FIG. 19, with portions of the leg assemblies 61 and 62 removed for discussion and with the gripping assembly 181 shown in the released position.

The angles at which upper and lower linkage arms 221 and 222 extend from their respective clamp bars 201 and 202 and the adjusted length of link 223 is set so that gripping assembly 181 has a clamping position 228 (FIG. 19) and, upon rotation of either one of the clamp bars 201 or 202, both clamp bars rotate (in opposite directions) about their axes to a released position 229 (FIG. 20), which is also part of the home position 260, described below. The released position 229 is characterized by the main bodies of the clamp tabs 203-206 all being in a vertical plane with their hooks 212-215 pointing forwardly (as shown in FIG. 20), and the clamping position 228 is characterized by the main bodies of the clamp tabs 203-206 all being in a horizontal plane with the hooks 212/213 of upper clamp tabs 203/204 pointing down and the hooks 214-215 of lower clamp tabs 205/206 pointing up (as shown in FIG. 19). And, if a bulk seed box 31 is positioned adjacent the stop bars 194/195 (and lower box stops 73/74) and clamp bars 201/202 are rotated from their released position 229 to their clamping position 228, the hooks 212-215 will engage over and to the inside of the upper and lower edges 36 and 37 of the upper seed box 10 and both clamp the box 10 between the upper clamp tabs 203/204 and the lower clamp tabs 205/206 and grasp (by virtue of the hooks 212-215) the box 10. The lower clamp tabs will, upon lifting box 10, bear most if not all the weight of the box, and the upper hooks 212 and 213 will primarily keep box 10 from rotating out and away from the clamped grip of the tabs 203-206. Alternative embodiments are contemplated wherein the clamp tabs have a different structure for clamping, gripping and/or holding a seed box. For example, one or more of the clamp tabs may have no hook. The bottom clamp tabs could have no hook, and without a hook could additionally be provided with a high friction grip surface that retards or prevents a seed box 10 sitting thereon from sliding off of such clamp tab 205/206. Likewise, the upper clamp tabs 203/204 could have no hook and be provided with an abrasive structure or other material (a high friction rubber, for example) that engages with and holds the top edge of the seed box 10 in position while it is being manipulated.

The handles 207 are rigidly connected and extend at right angles rearwardly (when in the clamping position 228, upwardly when in the released position 229), from opposite ends of the lower clamp bar 202, as shown. The user may thus grasp the handle 207 on either side of apparatus 50 and turn lower clamp bar 202 to move gripping assembly 181 between the clamping and released positions 228 and 229, respectively.

Figure 22:
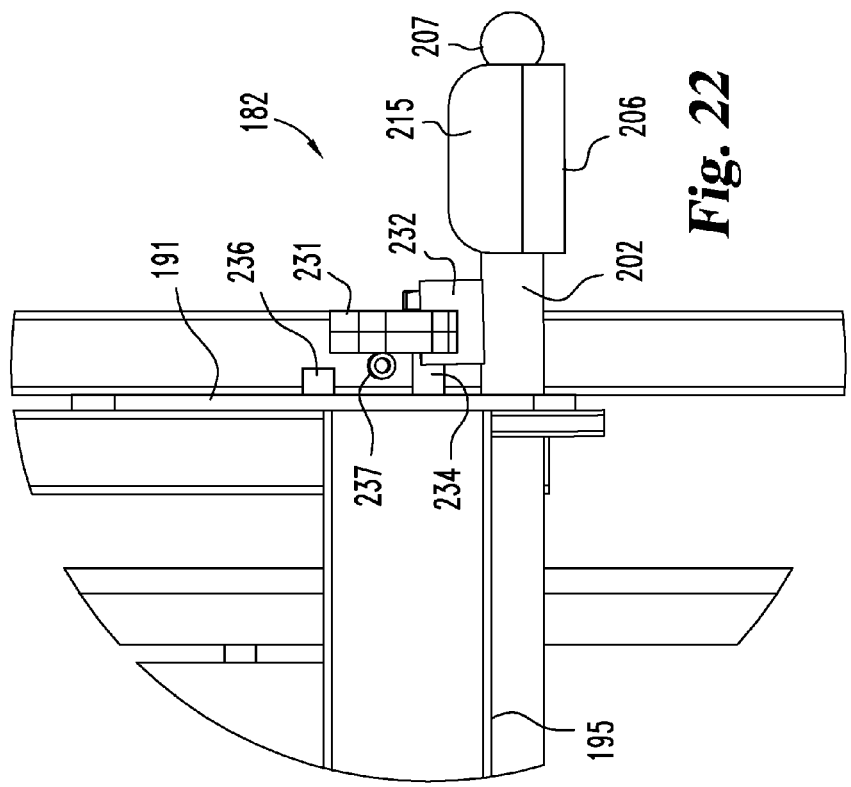
FIG. 22 is an enlarged view of a portion of the apparatus 50 of FIG. 21 and taken within the detail circle 22.
Figure 21:
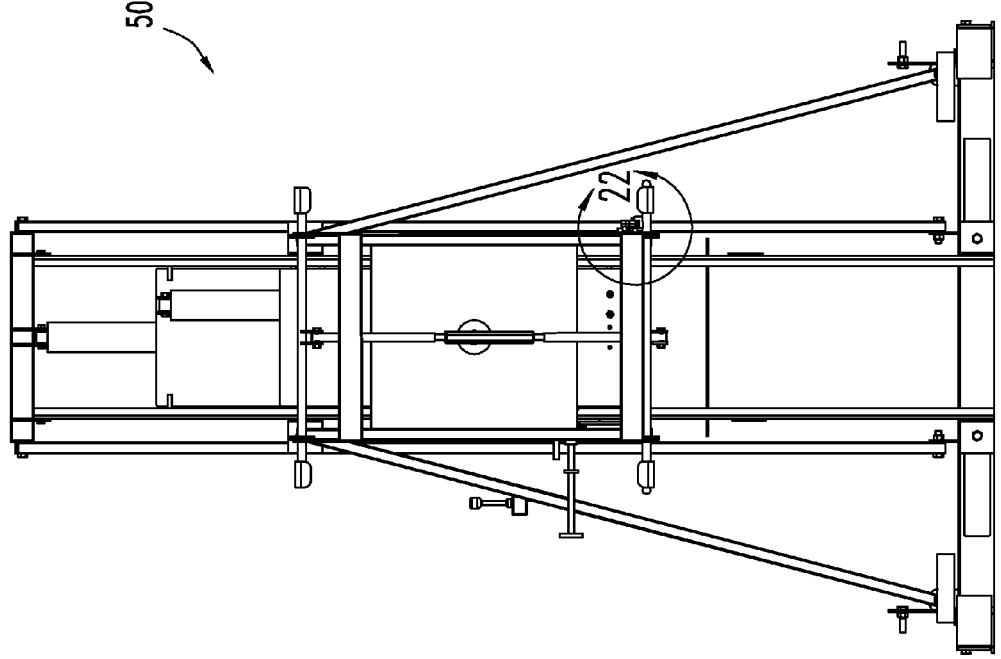
FIG. 21 is an elevation view of the apparatus 50 of FIG. 6.

Referring to FIGS. 19, 19A and 22, the locking assembly 182 of clamp assembly 55 includes a lock bar 231 and a lock stop 232. Lock stop is a block or other protuberance that extends outwardly from lower clamp bar 202, just inside of its clamp tab 206. Lock bar 231 is pivotally mounted via a pin 234 to the side of the corresponding lower (right) bar plate 191 and has a hook-shaped end (at 233). A torsion spring (not shown) is mounted to and between a spring mount 236 of bar plate 191 (FIG. 22) and a spring mount 237 of lock bar 231 to bias lock bar 231 down against clamp bar 202. When clamp bar 202 is in its released position 229 (FIG. 20), the lock stop 232 extends forwardly and below the hook-shaped end 233 of lock bar 231. When clamp bar 202 is rotated to its clamping position 228 (FIGS. 19A and 22), lock stop 232 rotates up, pushing hook-shaped end 233 of lock bar 231 up, against the bias of the spring (not shown) until lock stop 232 passes behind hook-shaped end 233, whereupon lock bar 231 rotates back down to its locking position (via the spring bias), and hook-shaped end 233 is now lockingly engaged forwardly of lock stop 232. Here, with the clamp tabs 202-206 in the clamping position (clamping an upper seed box 10 therebetween, as described below), lock stop 232 is lodged behind the hook-shaped end 233, and lower clamp bar 202—and thus upper clamp bar 201—are prevented from rotating out of the clamping position 228 (the tab locked position).

Locking assembly 182 includes manual release means for unlocking bar 231, which includes lock bar 231 having a handle portion 238 extending rearwardly of its pivotal mounting to bar plate 191. The user can manually unlock lock bar 231 by pushing down on the handle portion 238, thus raising hook-shaped end 233 up and clear of the lock stop 232 (the tab unlocked position).

Figure 23:
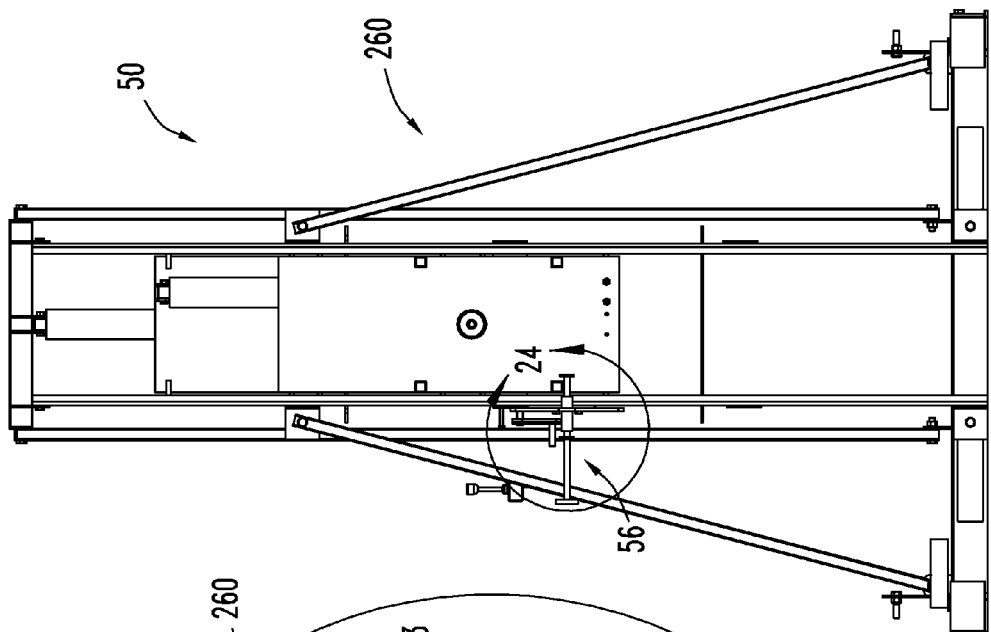
FIG. 23 is an elevation view of the apparatus 50 of FIG. 6 and with the clamp assembly 55 and portions of the swivel assembly removed for discussion.
Figure 24:
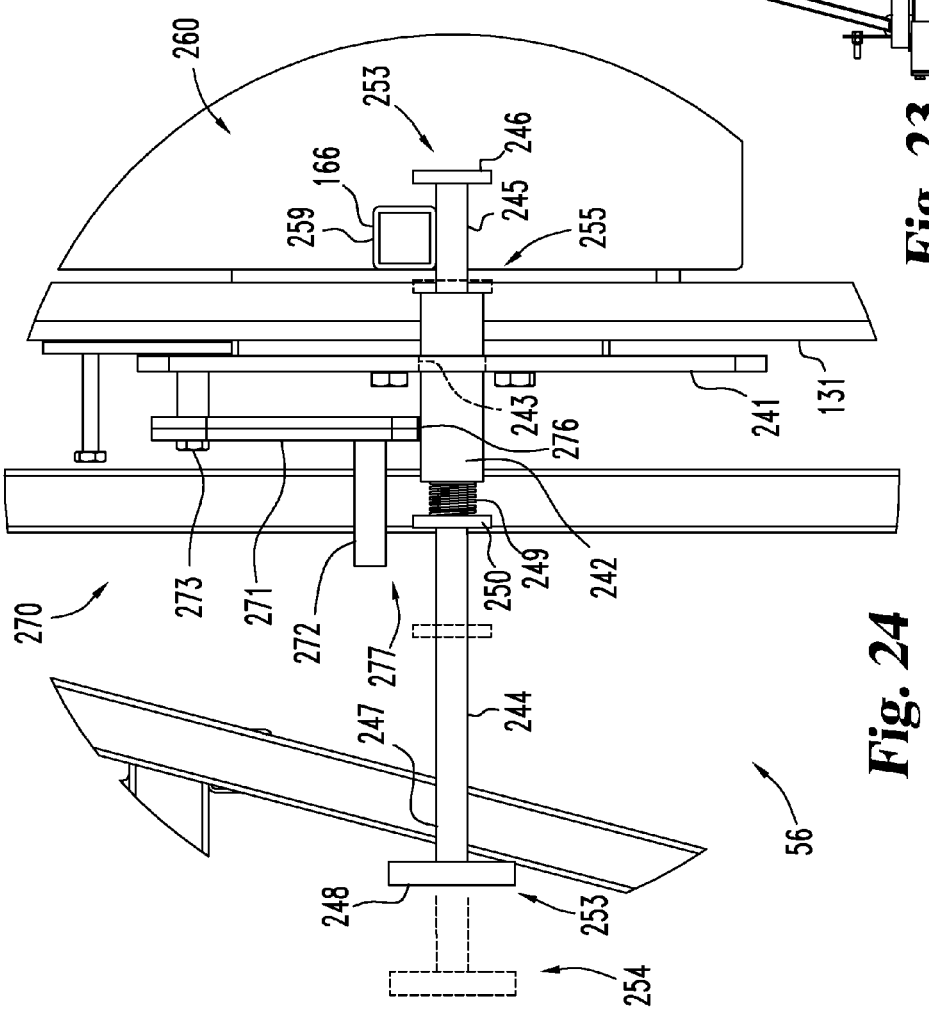
FIG. 24 is an enlarged view of a portion of the apparatus 50 of FIG. 23 and taken within the detail circle 24.

Referring to FIGS. 7, 23 and 24, the height locator assembly 56 includes a locator plate 241 mounted to the left side of vertical channel 131, a locator tube 242 extending laterally through a hole 243 defined in plate 241 and rigidly mounted to the plate 241 thereat, and a height locator pin 244 held for lateral sliding movement through the locator tube 242, as shown. Locator pin 244 extends outwardly from both ends of locator tube 242. Fixedly mounted to the inboard end 245 of locator pin 244, inside of locator tube 242, is a stop disc 246, which has a radius or other outer dimension that is greater than the inside radius (or dimension) of tube 242. Fixedly mounted to the outboard end 247 of pin 244, outside of locator tube 242 is a push disc 248. Locator pin 244 is biased outwardly by a spring 249 located between locator tube 242 and a spring retention washer 250 that is secured in the appropriate location on pin 244. Locator pin 244 thus moves between a home-locking position 253 (pushed all or most of the way in against the bias of spring 249, FIGS. 23 and 24) and a relaxed position 254 (FIGS. 15 and 24). In its relaxed position 254, locator pin 244 is biased outwardly, with stop disc 246 up against the inside of locator tube 242 (at 255). In the home-locking position 253, the inboard end 245 is directly subjacent a component of clamp assembly 55 or some component connected to move as a unit with the clamp assembly 55 (here that component is the lower, left mounting arm 166, but it could be another component, such as an arm connected with front plate 147) so that, upon engaging the top of height locator pin 244, clamp assembly 55—and any component connected to move vertically as a unit with clamp assembly 55—will be prevented from descending farther until pin 244 is withdrawn—that is, no longer directly below and in the path of the clamp assembly component (here, mounting arm 166).

In use, apparatus 50 and its clamp assembly 55 has a home position 260 (FIGS. 7, 23 and 24), which includes lift assembly 52 moving clamp assembly 55 to a height above the home position height; then the user pushes push disc 248 inwardly, against the bias of spring 249 (to the home-locking position 253); then the user lowers the clamp assembly 55 until the lower, left side mounting arm 259 (of mounting arms 166) rests atop the inboard end 245 of locator pin 244. The forgoing components are sized and configured so that, when apparatus 50 is in the home position 260, defined by height locator assembly 56, and when a bulk seed box 31 is maneuvered up to apparatus 50, between leg assemblies 61 and 62 and against box stops 73 and 74 and against stop bars 194 and 195, all four clamp tabs 203-206 are perfectly aligned with the upper and lower hand grip recesses 38-41 of the upper box 10 and ready to be rotated from their relaxed position 228 to their clamping position 229.

Alternative embodiments are contemplated wherein the components of height locator assembly 56 provide for ready vertical adjustment to accommodate differently sized seed boxes should they be developed. Such embodiment might include locator plate 241 defining slots so that its height relative to vertical channel 131 can easily be changed.

Alternative embodiments are also contemplated wherein height locator assembly 56 comprises different components and/or engages with one or more of the same or other components of swivel assembly 54 and/or clamp assembly 55 so long as the height locator assembly 56 locates clamp assembly 55 and its gripping assembly 181 in the home position 260. For example, instead of the sliding locator pin 244, a spring biased arm could be pivotally mounted to the lift assembly 52 (or a component thereof) to be pivoted to a position subjacent one of the mounting arms 166 (or other component of swivel assembly 54 and/or clamp assembly 55) to hold clamp assembly 55 at the proper height of the home position 260, and when clamp assembly 55 is raised, such pivoting arm—now free of the clamp assembly 55 component holding it down—would be free to pivot, at the urging of its spring, back to a disengaged position clear of the ensuing downward path of the clamp assembly 55. Or in the alternative, a spring biased tab or pin could be slid, pivoted or rocked into a notch defined in the swivel assembly 54 and/or clamp assembly 55, and only a slight raising of the swivel assembly 54 and/or clamp assembly 55 would allow it to slide, pivot or rock back to its disengaged position clear of the clamp assembly's path. Thus, the height locator pin 244 contemplates in alternative embodiments other members connected to the lift assembly 52 (or base assembly 51, of course) that releasably engage the clamp assembly 55 (which includes any component connected with the clamp assembly 55, such as the swivel assembly 54) that hold the clamp assembly 55 and its gripping assembly 181 in the desired home position 260.

Referring to FIGS. 7 and 24, on the left side of apparatus 50 there is shown an auto-release assembly 270 for unlocking the lock bar 231 of locking assembly 182. Auto-release assembly 270 includes a release bar 271 with release pin 272. Release bar 271 is pivotally mounted to the left side of C-shaped box rib 133 by a pivot pin 273. Release bar 271 extends forwardly from pivot pin 273, and at its outer end is mounted the release pin 272, which extends laterally outwardly therefrom (to the left, as viewed in FIGS. 7 and 24). Release bar 271 is sized and configured whereby its outer, lower end 276 rests atop locator tube 242 in its rest position 277. While the user can manually unlock lock bar 231 (FIGS. 19A and 22) by pushing down on the handle portion 238, thus raising hook-shaped end 233 up and clear of the lock stop 232, the release pin 272 of auto-release assembly 270 will automatically engage with the handle portion 238 and release (unlock) lock bar 231 when clamp assembly 55 is rotated and lowered (with an upper seed box 10 clamped in clamp assembly 55), the release occurring when the seed box 10 is just almost all the way down, as described below.

Alternative embodiments are contemplated wherein the locking assembly 182 is configured differently, but still operates to hold the gripping assembly 181 locked onto the seed box 10 while it is being manipulated. For example and without limitation, the locking assembly 182 could comprise linkages, operatively connected with one of the clamp bars 201/202 that provide an over-the-center locking function. The user would then simply have to rotate one of the handles 207/208 to overcome the slight resistance to rotating the clamp bars 201/202 back over center to unlock the clamp bars and the connected clamp tabs 203-206. Similarly, the auto-release function could be applied by positioning the release pin 272 near the bottom of guide assembly 101 to engage with the handle 208 as it descends, which would thus automatically rotate the clamp bars 201/202 back over center to unlock them.

Referring to FIG. 7, the control assembly 57 is there represented by a joystick controller, which is connected with a pneumatic pressure system (not shown). Such systems are well known and provide on-demand air pressure to the pneumatic cylinders 153 and 154. Moving the joystick controller 279 will thus cause cylinders 153 and 154 to extend and contract, thus raising and lowering the connected rear and front plate assemblies 102 and 104, respectively. Alternative embodiments are contemplated wherein other suitable engines for moving the rear and front plate assemblies 102 and 104 are used. For example, the pneumatic cylinders, pressure source and controls could be replaced with hydraulic cylinders, pressure source and controls, or with linear actuators.

In use, apparatus 50 is set in its home position 260 (FIGS. 7, 20, 23 and 24), which includes the gripping assembly 181 being in the released position (FIG. 20) and the combined swivel assembly 54 and clamp assembly 55 resting—via the lower left mounting arm 259—located at the proper height. A bulk (or combined) seed box 31 (FIG. 2) is maneuvered (typically using a fork lift, the forks extending through the fork gaps 86 of base 28) between leg assemblies 61 and 62 until the lower box 11 engages box stops 73 and 74 and upper box 10 engages stop bars 194 and 195. The user then rotates the lower clamp bar 202 using either handle 207 or 208, which simultaneously rotates both clamp bars 201/202 until gripping assembly 181 moves to the clamping position 228 (FIG. 19) whereby the upper clamp tabs 203 and 204 rotate down into the then adjacent upper hand grip recesses 38 and 39 of the upper box 10, and the lower clamp tabs 205 and 206 rotate up into the then adjacent lower hand grip recesses 41 and 42 of the upper box 10. Once fully rotated, the upper and lower clamp tabs 203-206—due to their proper sizing, configuration and mutual juxtaposition—are firmly clamping the upper box 10 in their grip. Also, the clamping position includes the lock stop 232 being held behind the hook-shaped end 233 of lock bar 231, so the upper box 231 is locked in the grasp of gripping assembly 181.

Figure 26:
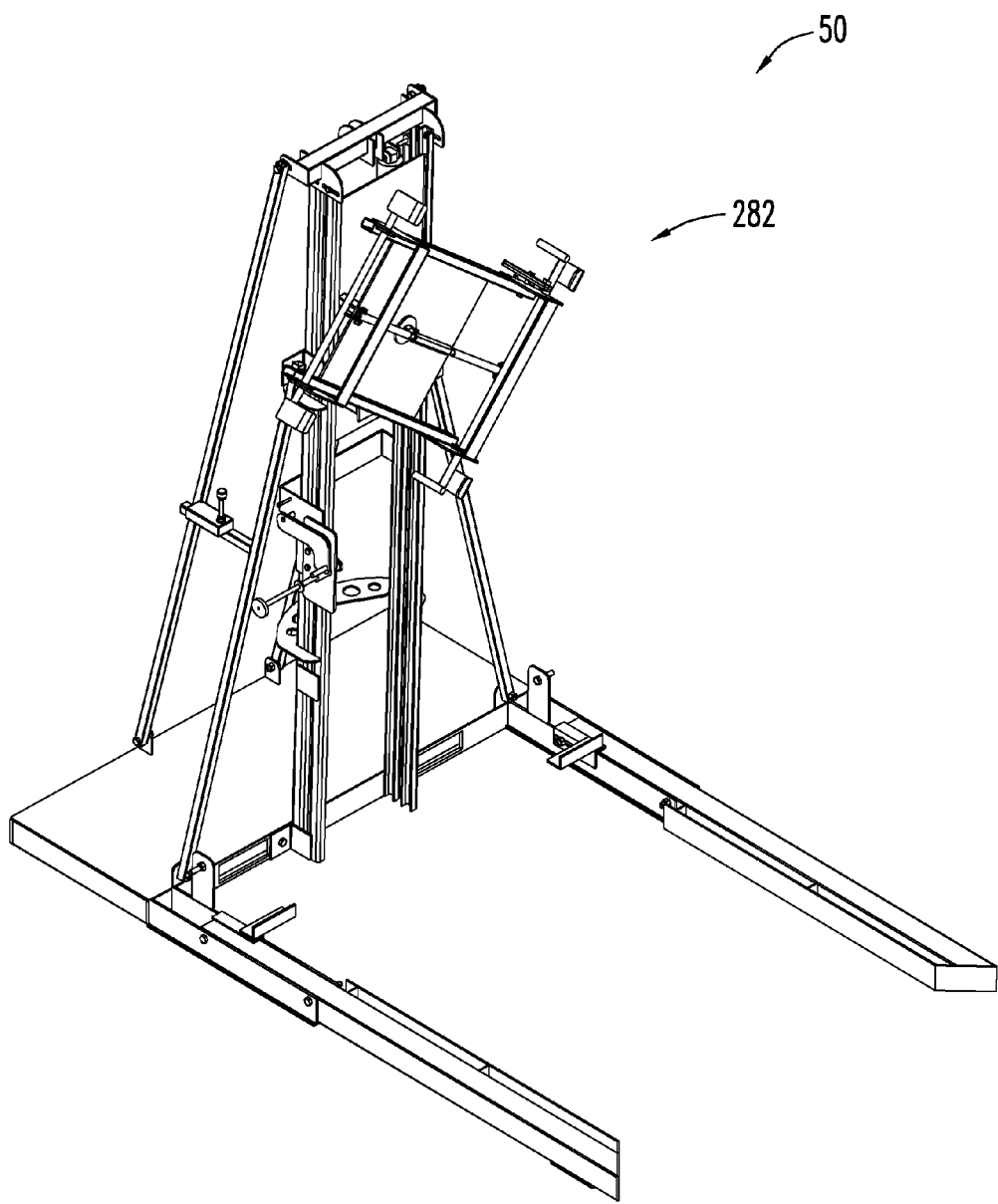
FIG. 26 is a left side perspective view of the apparatus 50 of FIG. 6 and shown in rotation mode 282.

Using joystick control 279, the user then raises the clamp assembly 55 (it is noted that the swivel assembly 54, clamp assembly 55 and its gripping assembly 181 are mutually connected to move vertically as a unit, and references to moving one or the other vertically are interchangeable) to its upper position 143 (FIG. 25), at which height the upper box 10 held by gripping assembly 181 is sufficiently above the lower box 11 that the user then easily, manually rotates the upper box 10 about the common axes of outer swivel tube 167 and inner mounting pipe 196 (as shown at 35 in FIG. 3 and at 282, without an attached box 10, in FIG. 26) until box 10 has been flipped completely over, and the opening 19 of upper box 10 is facing down. Using joystick control 279, the user then lowers the gripping assembly 181 and box 10 held thereby down all the way to the bottom, whereby the lower box 11 is telescopically received within the larger dimensioned upper box 10—now the nested box set 33 in the nested position 34 (FIG. 5).

Figure 27:
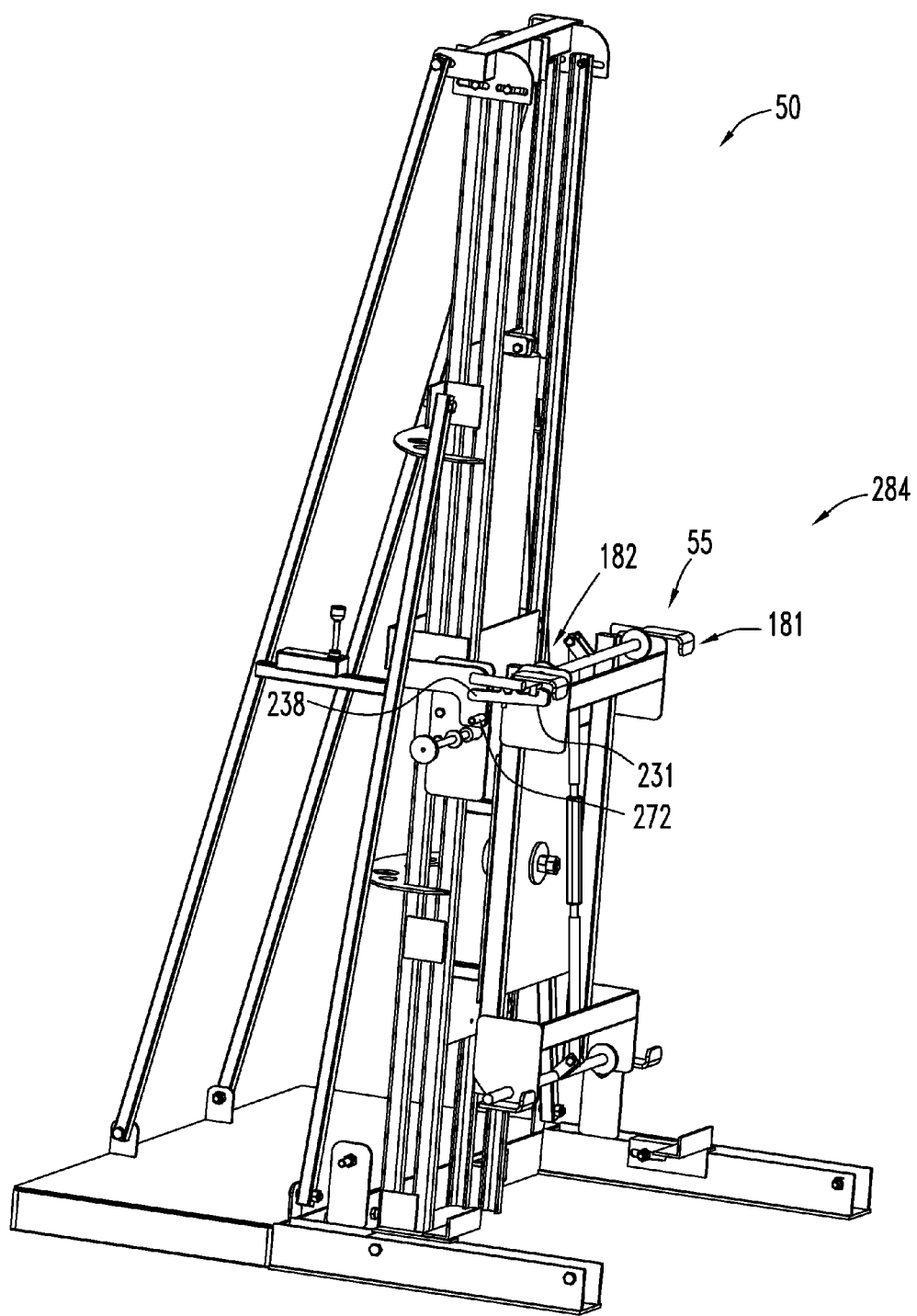
FIG. 27 is a left side perspective view of the apparatus 50 of FIG. 6 and shown with the locking assembly 282 in its flipped position 284 and with the clamp assembly 55 (and an upper seed box—not shown—held thereby) having been lowered nearly down to its lower position 144.
Figure 28:
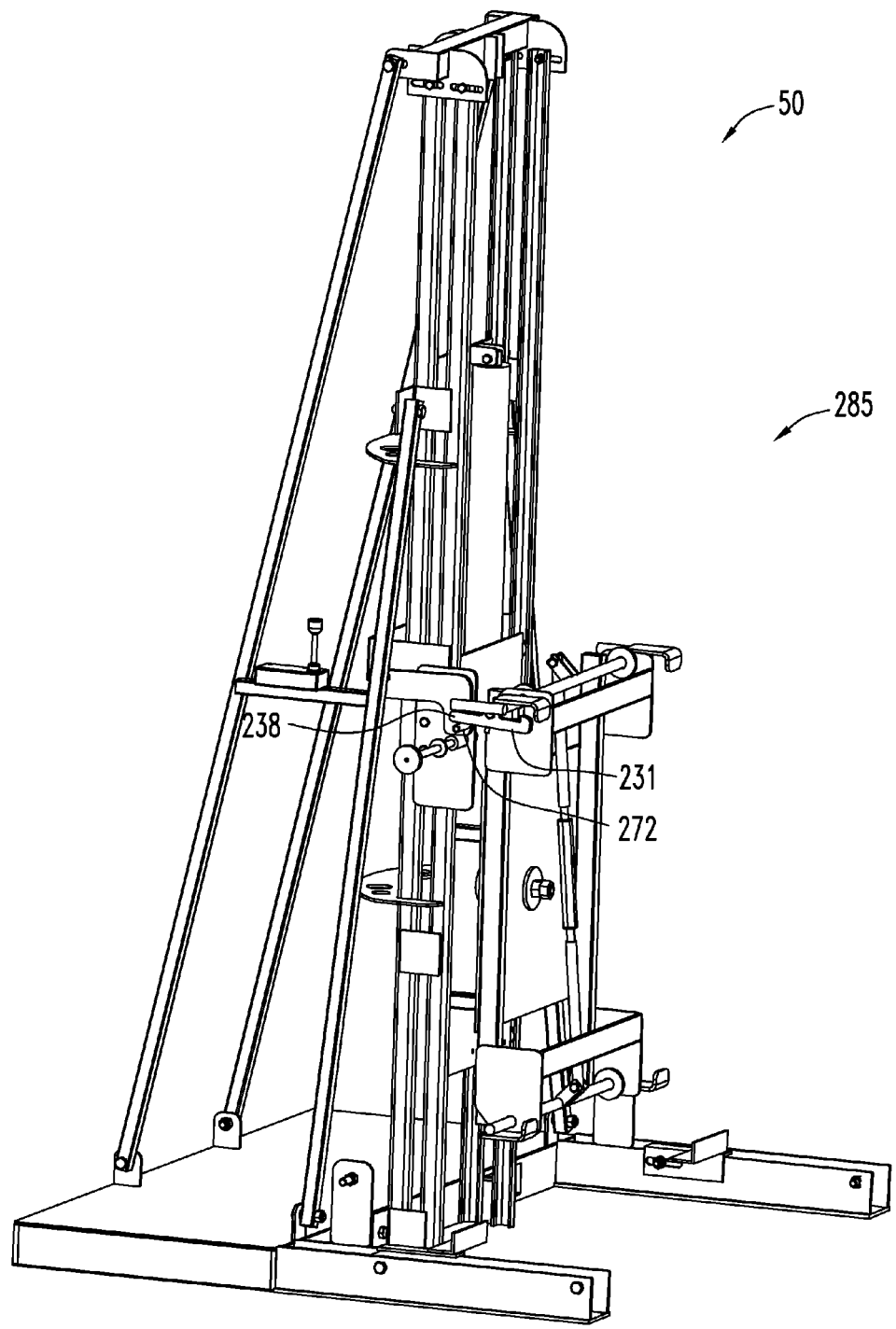
FIG. 28 is a left side perspective view of the apparatus 50 of FIG. 27 and with the clamp assembly 55 (and an upper seed box—not shown—held thereby) having been lowered nearly down to its lower position 144 where lock bar 231 is engaging with release pin 272.
Figure 29:
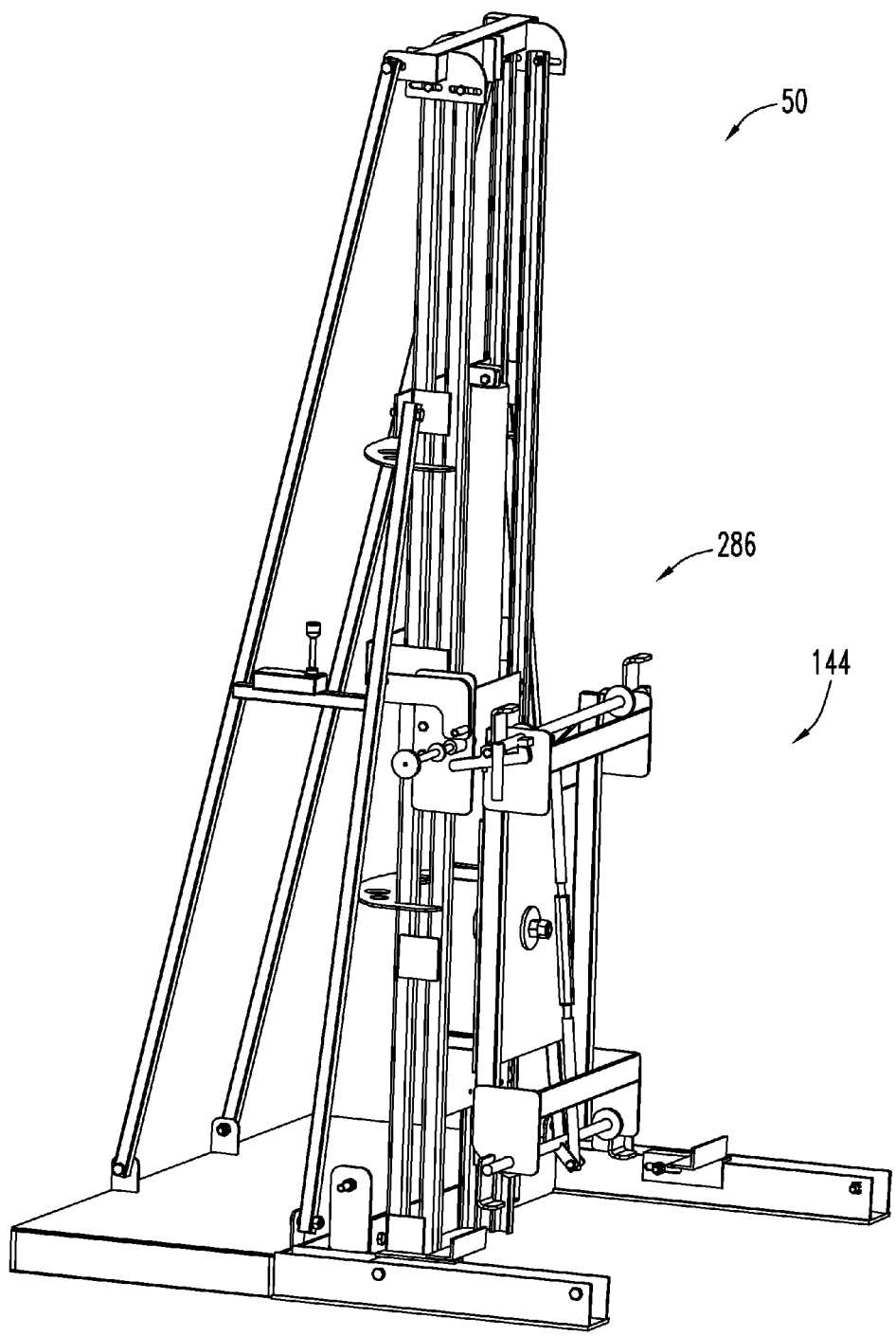
FIG. 29 is a left side perspective view of the apparatus 50 of FIG. 28 and with the clamp assembly 55 down to its lower position 144.

In its rotated or flipped position 284 (FIG. 27), the locking assembly 182 for holding the gripping assembly 181 locked onto the seed box 10 while it is being manipulated is now on the left side of apparatus 50. As the gripping assembly 181 nears the lower position 144, the handle portion 238 of lock bar 231 approaches the release pin 272 of auto-release assembly 270. As handle portion 238 contacts release pin 272, lock bar is rotated about its pivot pin 234 (at 285 in FIG. 28), and lock bar 231 is rotated to its unlocked position 286 (FIG. 29). Now that lower (and upper) clamp bars 201/202 are free to rotate, the weight of the upper box 10 upon the clamp tabs 203 and 204 (that are now under and bearing the weight of box 10) forces clamp tabs to rotate from their clamping position 228 to their released position 229, and box 10 falls freely the last inch or so until it rest upon lower box 11 (and its base 28, FIG. 5), the two boxes now comprising the nested box set 33.

The user now raises and rotates the clamp assembly 55, all back to the home position 260, for the next box to be flipped.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. An apparatus for manipulating a bulk seed box having a lower box and an upper box, the upper box defining a cavity and having opposing upper and lower edges, the apparatus comprising:
    a base assembly;
    a lift assembly mounted to said base assembly for selective raising and lowering a clamp assembly between lower and upper positions;
    a clamp assembly having a gripping assembly that has at least one upper clamp tab and at least one lower clamp tab and defines clamping and released positions, the clamping position including the at least one upper and at least one lower clamp tabs clamping a seed box positioned therebetween and the released position including the at least one upper and at least one lower clamp tabs not clamping a seed box therebetween;
    a swivel assembly defining a horizontal axis and being mounted to and between said lift assembly and said clamp assembly for enabling said clamp assembly to be rotated at least 180 degrees about the horizontal axis; and
    wherein the gripping assembly further includes a mounting frame and upper and lower clamp bars mounted for mutually parallel rotation to the mounting frame and wherein the at least one upper clamp tab is rigidly mounted to the upper clamp bar and the at least one lower clamp tab is rigidly mounted to the lower clamp bar.

2. The apparatus for manipulating a bulk seed box of claim 1 wherein at least one of the at least one upper and lower clamp tabs comprises two clamp tabs, horizontally spaced apart and rigidly mounted to opposing ends of the corresponding one of the upper and lower clamp bars.

3. The apparatus for manipulating a bulk seed box of claim 1 wherein said clamp assembly includes handle means for manually rotating the upper and lower clamp bars.

4. The apparatus for manipulating a bulk seed box of claim 1 wherein said clamp means includes a locking assembly for holding the gripping assembly locked in the clamping position, the locking assembly including a lock stop extending from one of the upper and lower clamp bars and a lock bar pivotally mounted to the mounting frame to pivot between a tab locked position engaged with the lock stop to prevent at least one of the upper and lower clamp bars from rotating and a tab unlocked position disengaged with the lock stop.

5. The apparatus for manipulating a bulk seed box of claim 4 wherein said clamp means further includes release means for unlocking the gripping assembly from the clamping position, the release means including a handle connected with the lock bar for pivoting the lock bar out of the tab locked position.

6. The apparatus for manipulating a bulk seed box of claim 4 wherein said apparatus has upper, lower and home positions and said clamp means further includes automatic release means for automatically unlocking the gripping assembly from the clamping position when said clamp assembly nears the lower position.

7. The apparatus for manipulating a bulk seed box of claim 6 wherein the automatic release means includes the lock bar having a handle for pivoting the lock bar out of the tab locked position and includes a release pin mounted to said lift assembly at a position to engage the handle to pivot the lock bar out of the tab locked position when said clamp assembly nears the lower position.

8. The apparatus for manipulating a bulk seed box of claim 7 wherein the release pin is mounted to a release bar that is pivotally mounted said lift assembly.

9. The apparatus for manipulating a bulk seed box of claim 1 further including a height locator assembly operable to locate said clamp assembly at a home position that is between the upper and lower positions and includes the at least one upper and lower clamp tabs being horizontally aligned with respective upper and lower edges of the upper seed box of a bulk seed box positioned proximal thereto, and wherein the locator assembly includes a height locator pin mounted to said lift assembly to move between a relaxed position disengaged from the clamping assembly and home-locking position holding said clamp assembly in the home position.

10. The apparatus for manipulating a bulk seed box of claim 9 wherein the height locator pin includes an inboard end and is slidably mounted to said lift assembly, and wherein the home-locking position includes the inboard end being juxtaposed subjacent a member connected with one of the said clamp assembly to prevent movement of said clamp assembly below the home position.

11. An apparatus for manipulating a bulk seed box having a lower box and an upper box, the upper box defining a cavity and having opposing upper and lower edges, the apparatus comprising:
    a base assembly;
    a lift assembly mounted to said base assembly for selective raising and lowering a clamp assembly between lower and upper positions;
    a clamp assembly having a gripping assembly that has at least one upper clamp tab and at least one lower clamp tab and defines clamping and released positions, the clamping position including the at least one upper and at least one lower clamp tabs clamping a seed box positioned therebetween and the released position including the at least one upper and at least one lower clamp tabs not clamping a seed box therebetween;
    a swivel assembly defining a horizontal axis and being mounted to and between said lift assembly and said clamp assembly for enabling said clamp assembly to be rotated at least 180 degrees about the horizontal axis; and
    wherein said lift assembly includes first and second guide assemblies, a rear plate mounted for vertical reciprocation in the first guide assembly and a front plate mounted for vertical reciprocation in the second guide assembly, and wherein said clamp assembly is connected to move as a unit with the front plate.

12. The apparatus for manipulating a bulk seed box of claim 11 further including a height locator assembly operable to locate said clamp assembly at a home position that is between the upper and lower positions and includes the at least one upper and lower clamp tabs being horizontally aligned with respective upper and lower edges of the upper seed box of a bulk seed box positioned proximal thereto, and wherein said lift assembly further includes motive means for selectively moving at least one of the rear and front plates from the home position to the upper position.

13. The apparatus for manipulating a bulk seed box of claim 12 wherein swivel assembly is connected to the front plate.

14. A method for manipulating a bulk seed box having a lower box and an upper box, the upper box defining a cavity and having opposing upper and lower edges, the method comprising the steps of:
providing an apparatus for manipulating a bulk seed box, comprising a base assembly; a lift assembly mounted to the base assembly for selective raising and lowering a clamp assembly between lower and upper positions; a clamp assembly having a gripping assembly that has at least one upper clamp tab and at least one lower clamp tab and defines clamping and released positions; a swivel assembly defining a horizontal axis and being mounted to and between said lift assembly and said clamp assembly for enabling said clamp assembly to be rotated at least 180 degrees about a horizontal axis; and a height locator assembly operable to locate said clamp assembly at a home position that is between the upper and lower positions and includes the at least one upper and lower clamp tabs being horizontally aligned with respective upper and lower edges of the upper seed box of a bulk seed box positioned proximal thereto;
positioning a bulk seed box proximal to said apparatus;
moving the clamp assembly to the home position;
moving the gripping assembly from the released to the clamping positions so that the at least one upper and at least one lower clamp tabs engage with the respective upper and lower edges of the upper seed box and clamp the upper seed box therebetween;
activating the lift assembly to raise the upper box toward the upper position, up and off of the lower box;
rotating the upper box 180 degrees about the horizontal axis;
activating the lift assembly to lower the upper box to the lower position, on top of the lower box, at least a portion of the lower box being received in the upper box cavity; and
moving the clamp assembly to the released position.

15. The method for manipulating a bulk seed box of claim 14 wherein said providing step includes the gripping assembly further including a mounting frame and upper and lower clamp bars mounted for mutually parallel rotation to the mounting frame and includes the at least one upper clamp tab being rigidly mounted to the upper clamp bar and the at least one lower clamp tab being rigidly mounted to the lower clamp bar.

16. The method for manipulating a bulk seed box of claim 14 wherein said providing step includes the gripping assembly including a coordination assembly linking the at least one upper and lower clamp tabs together to rotate in unison and in opposite directions.

17. The method for manipulating a bulk seed box of claim 14 wherein said providing step includes the clamp assembly including a locking assembly for holding the gripping assembly locked in the clamping position.

18. The method for manipulating a bulk seed box of claim 14 wherein said providing step further includes a height locator assembly operable to locate the clamp assembly at a home position that is between the upper and lower positions and includes the at least one upper and lower clamp tabs being horizontally aligned with respective upper and lower edges of the upper seed box of a bulk seed box positioned proximal thereto.

19. The method for manipulating a bulk seed box of claim 14 wherein said providing step includes a height locator assembly operable to locate said clamp assembly at a home position that is between the upper and lower positions and includes the at least one upper and lower clamp tabs being horizontally aligned with respective upper and lower edges of the upper seed box of a bulk seed box positioned proximal thereto, and further includes stop means for horizontally locating the upper seed box in position for clamping by said clamp assembly in the home position.

\* \* \* \* \*